US012413352B2

(12) United States Patent
Chen et al.

(10) Patent No.: US 12,413,352 B2
(45) Date of Patent: Sep. 9, 2025

(54) FRAME STRUCTURES FOR UPLINK CARRIER AGGREGATION OF TWO TIME DIVISION DUPLEX CARRIERS

(71) Applicant: QUALCOMM Incorporated, San Diego, CA (US)

(72) Inventors: Bo Chen, Beijing (CN); Wei Guan, Beijing (CN); Mingkai Nan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 18/000,351

(22) PCT Filed: Jul. 13, 2020

(86) PCT No.: PCT/CN2020/101645
§ 371 (c)(1),
(2) Date: Nov. 30, 2022

(87) PCT Pub. No.: WO2022/011503
PCT Pub. Date: Jan. 20, 2022

(65) Prior Publication Data
US 2023/0208576 A1 Jun. 29, 2023

(51) Int. Cl.
*H04L 5/00* (2006.01)
*H04L 5/22* (2006.01)
*H04W 72/044* (2023.01)

(52) U.S. Cl.
CPC ............... *H04L 5/001* (2013.01); *H04L 5/22* (2013.01); *H04W 72/044* (2013.01)

(58) Field of Classification Search
None
See application file for complete search history.

(56) References Cited

U.S. PATENT DOCUMENTS 9,084,279 B1 * 7/2015 Singh .................... H04W 24/02
10,237,105 B2 3/2019 Huang et al.
(Continued)

FOREIGN PATENT DOCUMENTS

CN 102244628 A 11/2011
CN 107959560 A 4/2018
(Continued)

OTHER PUBLICATIONS

Intel Corporation: "Views on EN-DC interworking NR UE performance requirements", 3GPP TSG-RAN WG4 Meeting #89, R4-1814547, NR UE NSA Performance Requirements, 3rd Generation Partnership Project, Mobile Competence Centre, 650, Route Des Lucioles, F-06921 Sophia-Antipolis Cedex, France, vol. RAN WG4, No. Spokane, USA, Nov. 12-Nov. 16, 2018, Nov. 11, 2018, pp. 1-4, XP051558936.
(Continued)

*Primary Examiner* — Brandon M Renner
(74) *Attorney, Agent, or Firm* — Harrity & Harrity, LLP\Qualcomm

(57) ABSTRACT

Various aspects of the present disclosure generally relate to wireless communication. In some aspects, a user equipment may receive a configuration for time division multiplexed uplink carrier aggregation of a first time division duplex carrier with a second time division duplex carrier, wherein a bandwidth of the second time division duplex carrier is lower than a bandwidth of the first time division duplex carrier, wherein the configuration indicates a frame structure corresponding to the second time division duplex carrier, and wherein the frame structure comprises a slot sequence, and communicate in accordance with the configuration. Numerous other aspects are provided.

30 Claims, 23 Drawing Sheets

(56) References Cited

U.S. PATENT DOCUMENTS

| | | | |
|---|---|---|---|
| 2010/0284367 A1* | 11/2010 | Koo | H04W 36/0058 370/331 |
| 2011/0211537 A1 | 9/2011 | Sivanesan et al. | |
| 2012/0163305 A1* | 6/2012 | Nimbalker | H04W 52/0206 370/329 |
| 2013/0195066 A1 | 8/2013 | Lee et al. | |
| 2013/0208686 A1* | 8/2013 | Zhang | H04W 72/23 370/329 |
| 2014/0369242 A1 | 12/2014 | Ng et al. | |
| 2015/0124728 A1* | 5/2015 | Bergstrom | H04L 5/001 370/329 |
| 2015/0295681 A1* | 10/2015 | Liang | H04W 72/0446 370/280 |
| 2017/0280507 A1* | 9/2017 | Wang | H04W 74/0833 |
| 2017/0332370 A1 | 11/2017 | Rico Alvarino et al. | |
| 2020/0119996 A1* | 4/2020 | Liu | H04L 5/14 |
| 2021/0022164 A1* | 1/2021 | Chen | H04L 5/1469 |

FOREIGN PATENT DOCUMENTS

| | | |
|---|---|---|
| CN | 110858795 A | 3/2020 |
| WO | 2015010595 A1 | 1/2015 |
| WO | 2015020403 A1 | 2/2015 |
| WO | 2018128865 | 7/2018 |
| WO | 2019001684 A1 | 1/2019 |

OTHER PUBLICATIONS

Supplementary European Search Report—EP20945327—Search Authority—The Hague—Apr. 19, 2024.

Zte, et al., "Detailed Design on Uplink Aspects to Support TDD NB-IoT", 3GPP TSG RAN WG1 Meeting #90bis, R1-1717203, Prague, Czechia, Oct. 9-13, 2017, 11 pages.

Ericsson: "TDD Configuration for RRM Performance Requirements," 3GPP TSG-RAN WG4 Meeting #88bis, R4-1812846, Oct. 8-12, 2018, Sep. 28, 2018 (Sep. 28, 2018), the whole document, 8 pages.

International Search Report and Written Opinion—PCT/CN2020/101645—ISA/EPO—Mar. 25, 2021.

\* cited by examiner

FRAME STRUCTURES FOR UPLINK CARRIER AGGREGATION OF TWO TIME DIVISION DUPLEX CARRIERS

CROSS-REFERENCE TO RELATED APPLICATION

This Patent Application is a 371 national stage of PCT Application No. PCT/CN2020/101645 filed on Jul. 13, 2020, entitled "FRAME STRUCTURES FOR UPLINK CARRIER AGGREGATION OF TWO TIME DIVISION DUPLEX CARRIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for frame structures for uplink carrier aggregation of two time division duplex carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving a configuration for time division multiplexed (TMDed) uplink (UL) carrier aggregation (CA) of a first time division duplex (TDD) carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first downlink (DL) sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots; and communicating in accordance with the configuration.

In some aspects, a method of wireless communication performed by a base station includes: transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots; and communicating in accordance with the configuration.

In some aspects, a non-transitory computer-readable medium storing a set of instructions for wireless communication includes one or more instructions that, when executed by one or more processors of a UE, cause the UE to: receive a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots; and communicate in accordance with the configuration.

In some aspects, a non-transitory computer-readable medium storing a set of instructions for wireless communication includes one or more instructions that, when executed by one or more processors of a base station, cause the base station to: transmit a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots; and communicate in accordance with the configuration.

In some aspects, an apparatus for wireless communication includes: means for receiving a configuration for TMDed UL CA of a first TDD carrier with a second TDD carrier, wherein a bandwidth of the second carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots; and means for communicating in accordance with the configuration.

In some aspects, an apparatus for wireless communication includes: means for transmitting a configuration for TMDed UL CA of a first carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots; and means for communicating in accordance with the configuration.

In some aspects, a method of wireless communication performed by a UE includes: receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots; and communicating in accordance with the configuration.

In some aspects, a method of wireless communication performed by a base station includes: transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots; and communicating in accordance with the configuration.

In some aspects, a non-transitory computer-readable medium storing a set of instructions for wireless communication includes one or more instructions that, when executed by one or more processors of a UE, cause the UE to: receive a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots; and communicate in accordance with the configuration.

In some aspects, a non-transitory computer-readable medium storing a set of instructions for wireless communication includes one or more instructions that, when executed by one or more processors of a base station, cause the base station to: transmit a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots; and communicate in accordance with the configuration.

In some aspects, an apparatus for wireless communication includes: means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots; and means for communicating in accordance with the configuration.

In some aspects, an apparatus for wireless communication includes: means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots; and means for communicating in accordance with the configuration.

In some aspects, a method of wireless communication performed by a UE includes: receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots; and communicating in accordance with the configuration.

In some aspects, a method of wireless communication performed by a base station includes: transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots; and communicating in accordance with the configuration.

In some aspects, a non-transitory computer-readable medium storing a set of instructions for wireless communication includes one or more instructions that, when executed by one or more processors of a UE, cause the UE to: receive a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots; and communicate in accordance with the configuration.

In some aspects, a non-transitory computer-readable medium storing a set of instructions for wireless communication includes one or more instructions that, when executed by one or more processors of a base station, cause the base station to: transmit a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots; and communicate in accordance with the configuration.

In some aspects, an apparatus for wireless communication includes: means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots; and means for communicating in accordance with the configuration.

In some aspects, an apparatus for wireless communication includes: means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots; and means for communicating in accordance with the configuration.

In some aspects, a method of wireless communication performed by a UE includes: receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots; and communicating in accordance with the configuration.

In some aspects, a method of wireless communication performed by a base station includes: transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots; and communicating in accordance with the configuration.

In some aspects, a non-transitory computer-readable medium storing a set of instructions for wireless communication includes one or more instructions that, when executed by one or more processors of a UE, cause the UE to: receive a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots; and communicate in accordance with the configuration.

In some aspects, a non-transitory computer-readable medium storing a set of instructions for wireless communication includes one or more instructions that, when executed by one or more processors of a base station, cause the base station to: transmit a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots; and communicate in accordance with the configuration.

In some aspects, an apparatus for wireless communication includes: means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots; and means for communicating in accordance with the configuration.

In some aspects, an apparatus for wireless communication includes: means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots; and means for communicating in accordance with the configuration.

In some aspects, a method of wireless communication performed by a UE includes: receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots; and communicating in accordance with the configuration.

In some aspects, a method of wireless communication performed by a base station includes: transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots; and communicating in accordance with the configuration.

In some aspects, a non-transitory computer-readable medium storing a set of instructions for wireless communication includes one or more instructions that, when executed by one or more processors of a UE, cause the UE to: receive a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots; and communicate in accordance with the configuration.

In some aspects, a non-transitory computer-readable medium storing a set of instructions for wireless communication includes one or more instructions that, when executed by one or more processors of a base station, cause the base station to: transmit a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots; and communicate in accordance with the configuration.

In some aspects, an apparatus for wireless communication includes: means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots; and means for communicating in accordance with the configuration.

In some aspects, an apparatus for wireless communication includes: means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots; and means for communicating in accordance with the configuration.

In some aspects, a method of wireless communication performed by a UE includes: receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots; and communicating in accordance with the configuration.

In some aspects, a method of wireless communication performed by a base station includes: transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots; and communicating in accordance with the configuration.

In some aspects, a non-transitory computer-readable medium storing a set of instructions for wireless communication includes one or more instructions that, when executed by one or more processors of a UE, cause the UE to: receive a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots; and communicate in accordance with the configuration.

In some aspects, a non-transitory computer-readable medium storing a set of instructions for wireless communication includes one or more instructions that, when executed by one or more processors of a base station, cause the base station to: transmit a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots; and communicate in accordance with the configuration.

In some aspects, an apparatus for wireless communication includes: means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots; and means for communicating in accordance with the configuration.

In some aspects, an apparatus for wireless communication includes: means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots; and means for communicating in accordance with the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
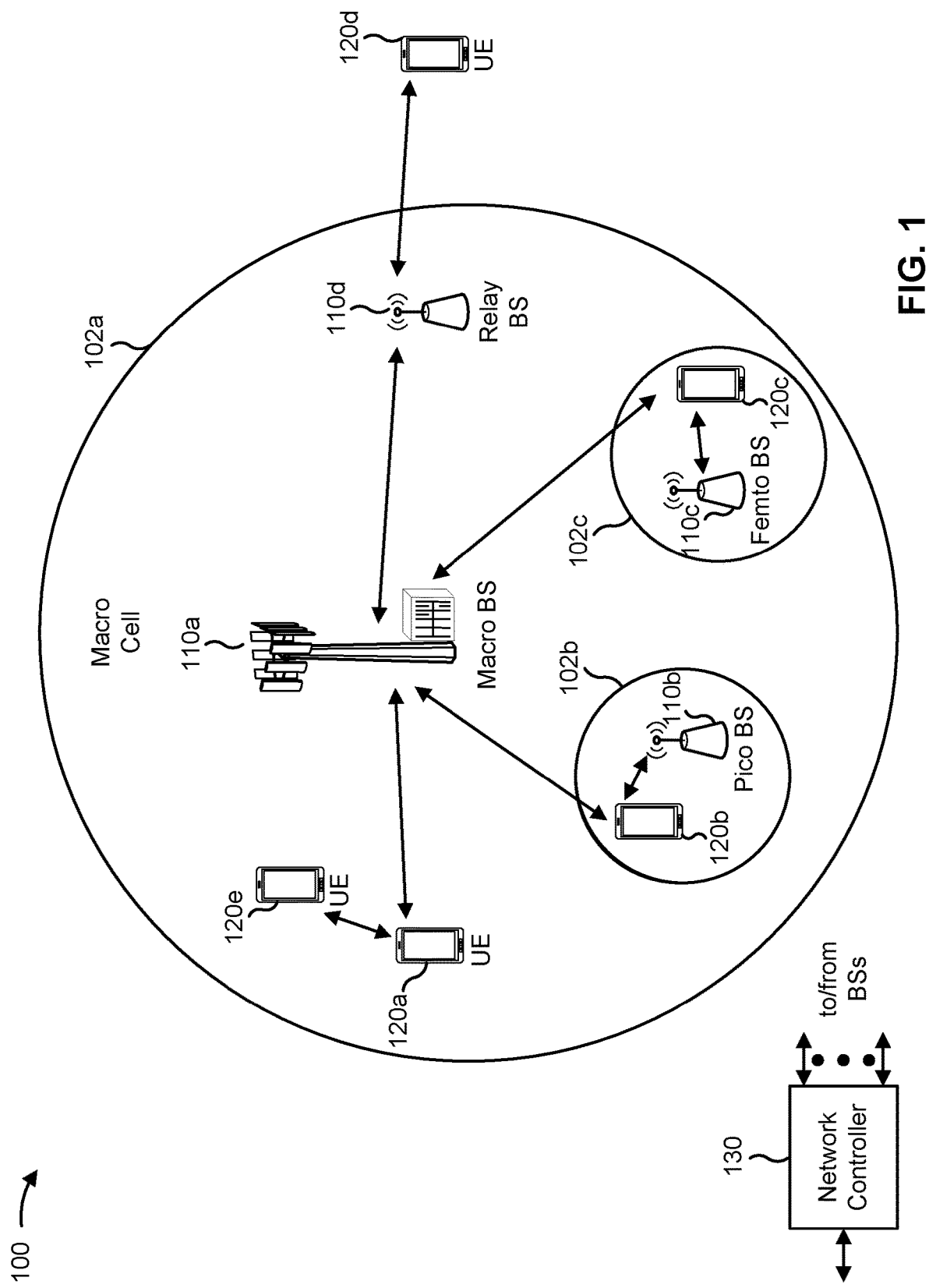
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHZ, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
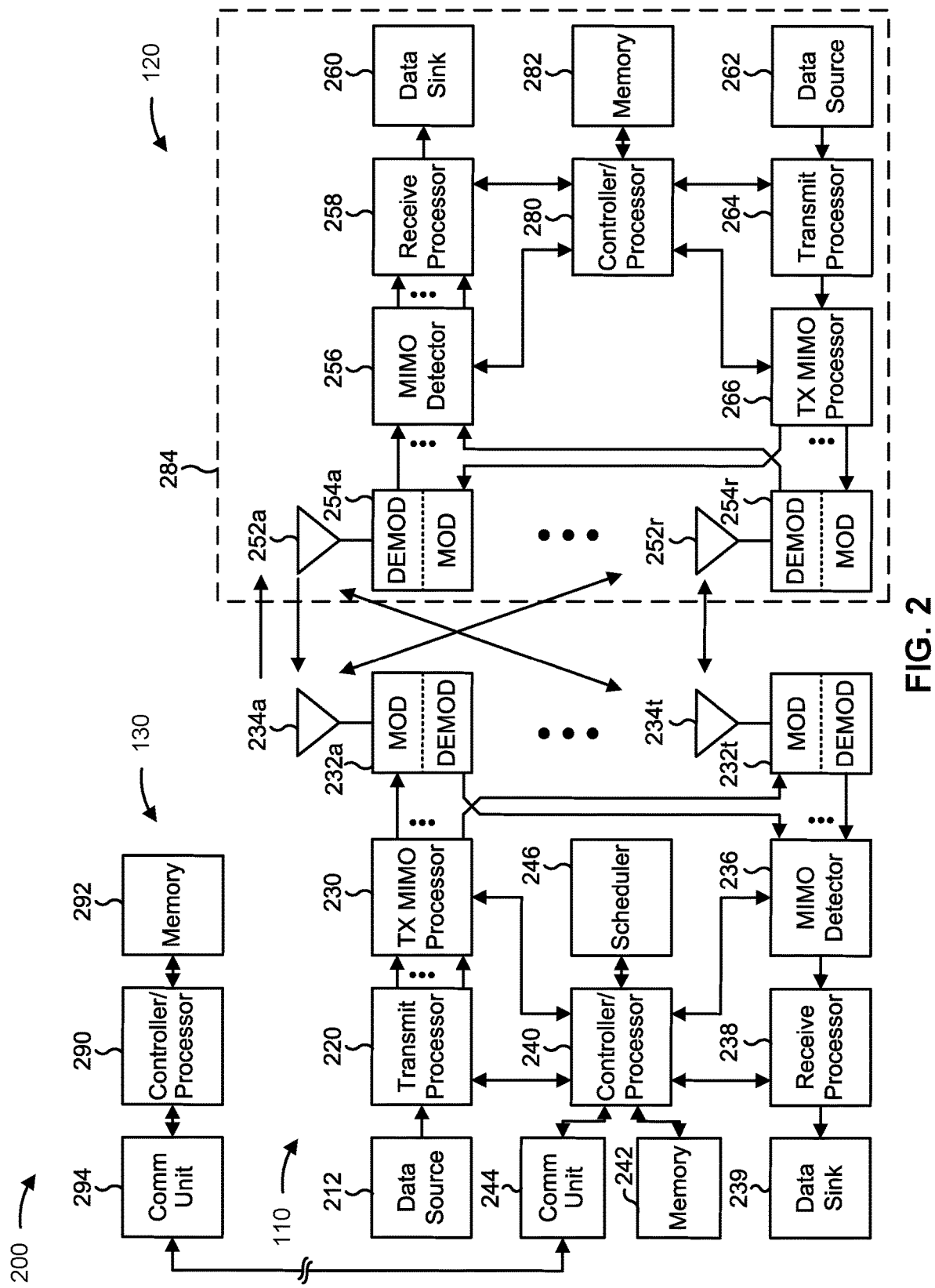
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-23.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-23.

Controller/processor 240 of base station 110, controller/processor 280 of UE 120, and/or any other component(s) of FIG. 2 may perform one or more techniques associated with frame structures for uplink (UL) carrier aggregation (CA) of two time division duplex (TDD) carriers, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, process 2300 of FIG. 23, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, process 2100 of FIG. 21, process 2200 of FIG. 22, process 2300 of FIG. 23, and/or other processes as described herein. In some aspects, executing instructions may include running the instructions, converting the instructions, compiling the instructions, interpreting the instructions, and/or the like.

In some aspects, UE 120 may include means for receiving a configuration for time division multiplexed (TDMed) UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first downlink (DL) sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots, means for communicating in accordance with the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a configuration for TDMed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots, means for communicating in accordance with the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a configuration for TMDed uplink CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots, means for communicating in accordance with the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a configuration for TMDed uplink CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots, means for communicating in accordance with the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots, means for communicating in accordance with the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots, means for communicating in accordance with the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots, means for communicating in accordance with the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots, means for communicating in accordance with the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots, means for communicating in accordance with the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots, means for communicating in accordance with the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots, means for communicating in accordance with the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including: a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots, means for communicating in accordance with the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some wireless communication technologies may use multiple, different UL carriers for communication between a UE and a base station. An example of such a technology includes UL CA. In some deployments utilizing multiple UL carriers, time division multiplexing (TDM) may be used to ensure that UL communications on the multiple UL carriers do not collide. For example, a first TDD carrier may be time division multiplexed (TDMed) with a second TDD carrier, so that only one of the TDD carriers is used for an uplink communication at a time. This may reduce hardware complexity of the UE and/or the base station.

Time domain resources associated with a particular carrier may be specified in terms of frames. A frame structure associated with a particular carrier indicates the number, type, and order of slots within each frame for that carrier, based on a particular numerology. Frame structures are defined for certain carriers and may be designed, in particular, for 5G operators.

For example, a frame structure associated with band N78 for use by one operator in China includes a 2.5 millisecond dual cycle slot sequence (represented as DDDSUDDSUU) that includes a first DL sequence including three consecutive DL slots ("DDD"), a first special sequence following the first DL sequence, where the first special sequence includes one special slot ("S"), a first UL sequence following the first special sequence, where the first UL sequence includes one UL slot ("U"), a second DL sequence following the first UL sequence, where the second DL sequence includes two consecutive DL slots ("DD"), a second special sequence following the second DL sequence, where the second special sequence includes one special slot ("S"), and a second UL sequence following the second special sequence, where the second UL sequence includes two consecutive UL slots ("UU"). The same frame structure has been defined for band N79 for use by another 5G operator in China.

An NR TDD carrier, band N40, having a frequency range of 2300-2400 MHz, may be deployed. A 5G operator that supports the band N40 may provide additional throughput and reduced latency by facilitating UL multiple-input multiple-output (MIMO) across an uplink CA of band N40 with another TDD carrier having a higher bandwidth, such as band N78 or band N79. However, a frame structure for N40 has not been specified. Additionally, in a typical TDD+TDD CA, both carriers may have identical frame structures. However, aggregation of carriers having identical frame structures may not be able to support TDM UL CA because all of the UL slots are overlapped.

Aspects of the techniques described herein facilitate configuring UEs with frame structures for TDM UL CA of a first TDD carrier with a second TDD carrier. In some aspects, a second TDD carrier frame structure may include a timing offset relative to the first TDD carrier frame structure. In some aspects, a configuration may support cell center communications with transmission switching. In some aspects, a configuration may support cell edge communications without transmission switching. Various aspects of the configurations described herein may facilitate TDD+TDD TDM UL CA, which may be used to provide increased throughput, decreased latency, and/or the like.

FIGS. 3-11 are diagrams illustrating examples associated with frame structures for UL CA of two TDD carriers, in accordance with various aspects of the present disclosure. In FIGS. 3-11, DL slots are indicated by the letter D, UL slots are indicated by the letter U, and special slots are indicated by the letter S. UL transmissions may occur in special slots or UL slots. An "X" on a resource of an uplink carrier indicates that that resource is unavailable for transmission because the UE has switched to the other TDD carrier.

In some aspects, a bandwidth of the second TDD carrier may be lower than a bandwidth of the first TDD carrier. In some aspects, the first TDD carrier may be a 3.5 GHz bandwidth carrier having a 30 kHz subcarrier spacing (SCS). In some aspects, the first TDD carrier may be a 4.9 GHz bandwidth carrier having a 30 kHz SCS. In some aspects, the first TDD carrier may include an N78 band carrier, an N79 band carrier, and/or the like. In some aspects, the second TDD carrier may include a 2.3-2.4 GHZ bandwidth carrier having a 30 kHz SCS. In some aspects, the second TDD carrier may include an N40 band carrier.

In some aspects, UL transmission (Tx) may be supported on the first TDD carrier and/or the second TDD carrier. In some aspects, the first TDD carrier and/or the second TDD carrier may support a maximum rank of two. In some aspects, 2Tx-2Tx switching may be supported across the first TDD carrier and the second TDD carrier.

Figure 3:
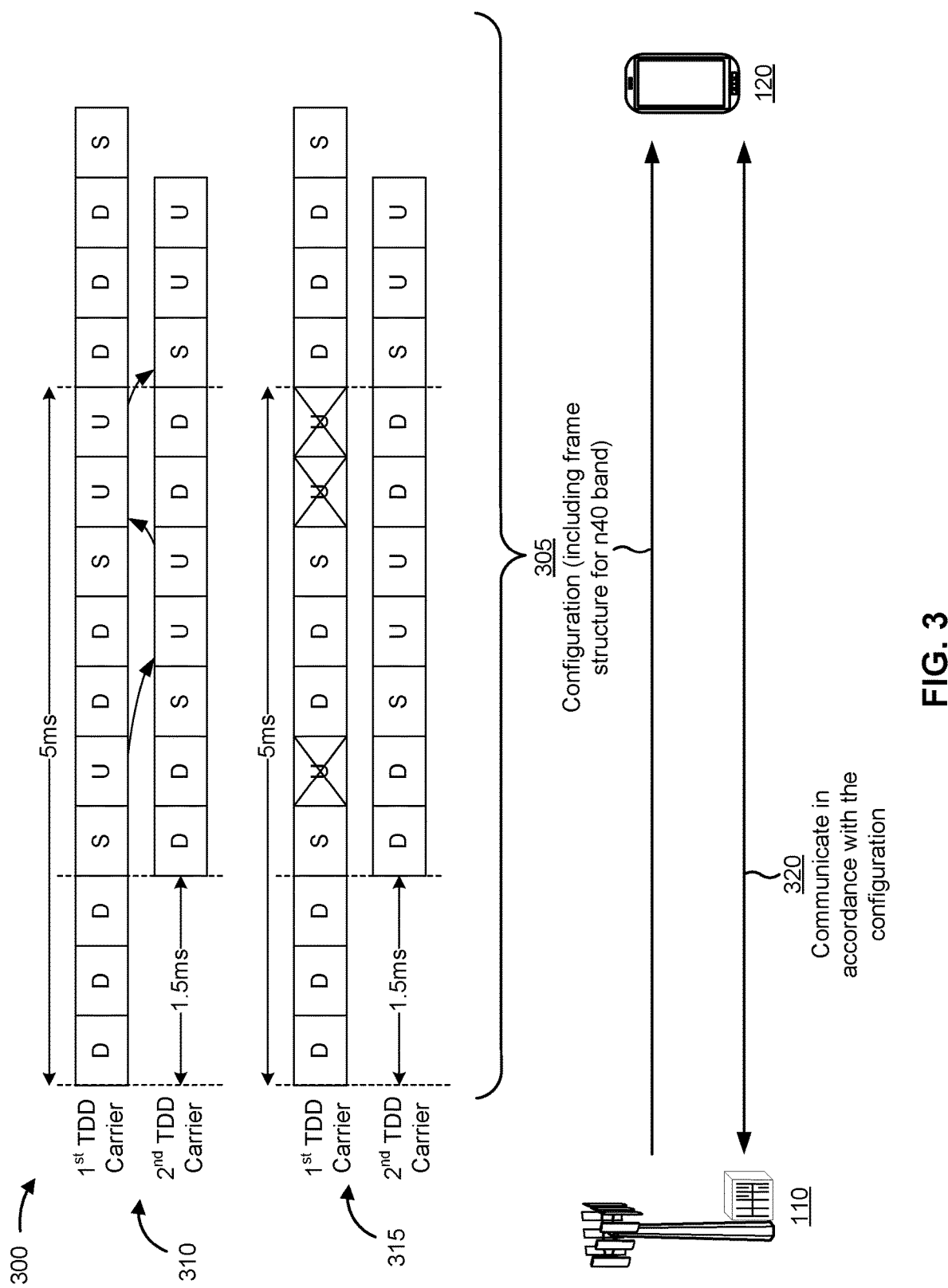
FIGS. 3-11 are diagrams illustrating examples associated with frame structures for uplink (UL) carrier aggregation (CA) of two TDD (TDD) carriers, in accordance with various aspects of the present disclosure.

FIG. 3 is a diagram illustrating an example 300 associated with UL CA of two TDD carriers, in accordance with various aspects of the present disclosure. As shown in FIG. 3, a base station 110 and a UE 120 may communicate with one another.

As shown by reference number 305, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 2.5 millisecond single cycle slot sequence. The slot sequence may include a first DL sequence. In some aspects, the first DL sequence may include two consecutive DL slots. A first special sequence may follow the first DL sequence. In some aspects, the first special sequence may include one special slot. A first UL sequence may follow the first special sequence. In some aspects, the first UL sequence may include two consecutive UL slots. In some aspects, the frame structure may include a 1.5 millisecond offset preceding the first DL sequence.

As shown, the frame structure corresponding to the first TDD carrier may include a 2.5 millisecond dual cycle slot sequence including a second DL sequence including three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 310, the configuration may support cell center communications with transmission switching. As shown, the UL CA may provide twelve slots that support DL transmissions and seven slots that support UL transmissions. As shown by reference number 315, the configuration may support cell edge communications without transmission switching. As shown, the UL CA may provide twelve slots that support DL transmissions and four slots that support UL transmissions.

As shown by reference number 320, the base station 110 and the UE 120 may communicate with one another in accordance with the configuration.

As indicated above, FIG. 3 is provided as an example. Other examples may differ from what is described with respect to FIG. 3.

Figure 4:
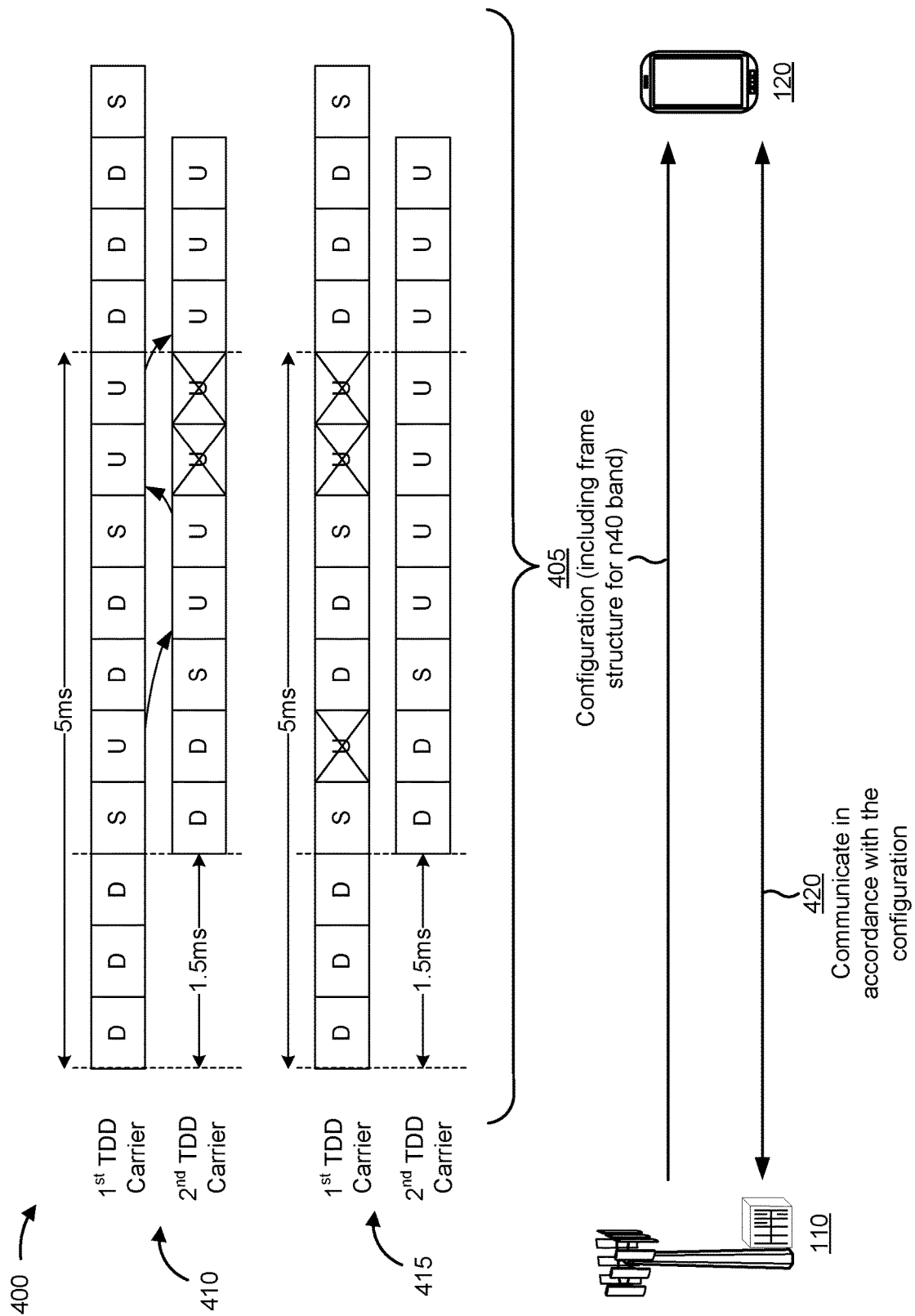

FIG. 4 is a diagram illustrating an example 400 associated with UL CA of two TDD carriers, in accordance with various aspects of the present disclosure. As shown in FIG. 4, a base station 110 and a UE 120 may communicate with one another.

As shown by reference number 405, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 5 millisecond single cycle slot sequence. The slot sequence may include a first DL sequence. In some aspects, the first DL sequence may include two consecutive DL slots. A first special sequence may follow the first DL sequence. In some aspects, the first special sequence may include one special slot. A first UL sequence may follow the first special sequence. In some aspects, the first UL sequence may include seven consecutive UL slots. In some aspects, the frame structure may include a 1.5 millisecond offset preceding the first DL sequence.

As shown, the frame structure corresponding to the first TDD carrier may include a 2.5 millisecond dual cycle slot sequence including a second DL sequence including three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 410, the configuration may support cell center communications with transmission switching. As shown, the UL CA may provide ten slots that support DL transmissions and eight slots that support UL transmissions. As shown by reference number 415, the configuration may support cell edge communications without transmission switching. As shown, the UL CA may provide ten slots that support DL transmissions and seven slots that support UL transmissions.

As shown by reference number 420, the base station 110 and the UE 120 may communicate with one another in accordance with the configuration.

As indicated above, FIG. 4 is provided as an example. Other examples may differ from what is described with respect to FIG. 4.

Figure 5:
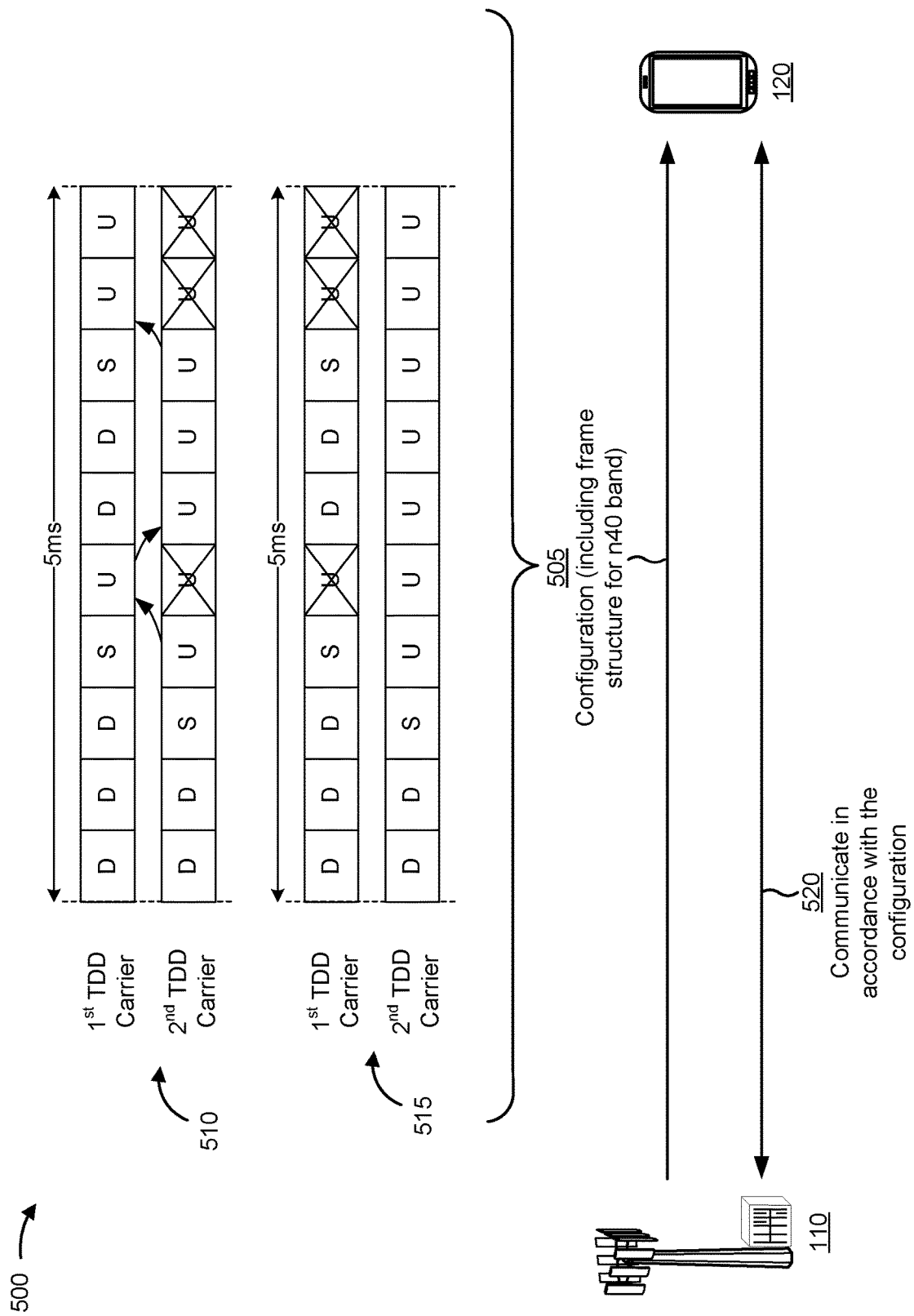

FIG. 5 is a diagram illustrating an example 500 associated with UL CA of two TDD carriers, in accordance with various aspects of the present disclosure. As shown in FIG. 5, a base station 110 and a UE 120 may communicate with one another.

As shown by reference number 505, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 5 millisecond single cycle slot sequence. The slot sequence may include a first DL sequence. In some aspects, the first DL sequence may include two consecutive DL slots. A first special sequence may follow the first DL sequence. In some aspects, the first special sequence may include one special slot. A first UL sequence may follow the first special sequence. In some aspects, the first UL sequence may include seven consecutive UL slots. In some aspects, the frame structure does not include an offset.

As shown, the frame structure corresponding to the first TDD carrier may include a 2.5 millisecond dual cycle slot sequence. The slot sequence may include a second DL sequence. The second DL sequence may include three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 510, the configuration may support cell center communications with transmission switching. As shown, the UL CA may provide ten slots that support DL transmissions and seven slots that support UL transmissions. As shown by reference number 515, the configuration may support cell edge communications without transmission switching. As shown, the UL CA may provide ten slots that support DL transmissions and seven slots that support UL transmissions.

As shown by reference number 520, the base station 110 and the UE 120 may communicate with one another in accordance with the configuration.

As indicated above, FIG. 5 is provided as an example. Other examples may differ from what is described with respect to FIG. 5.

Figure 6:
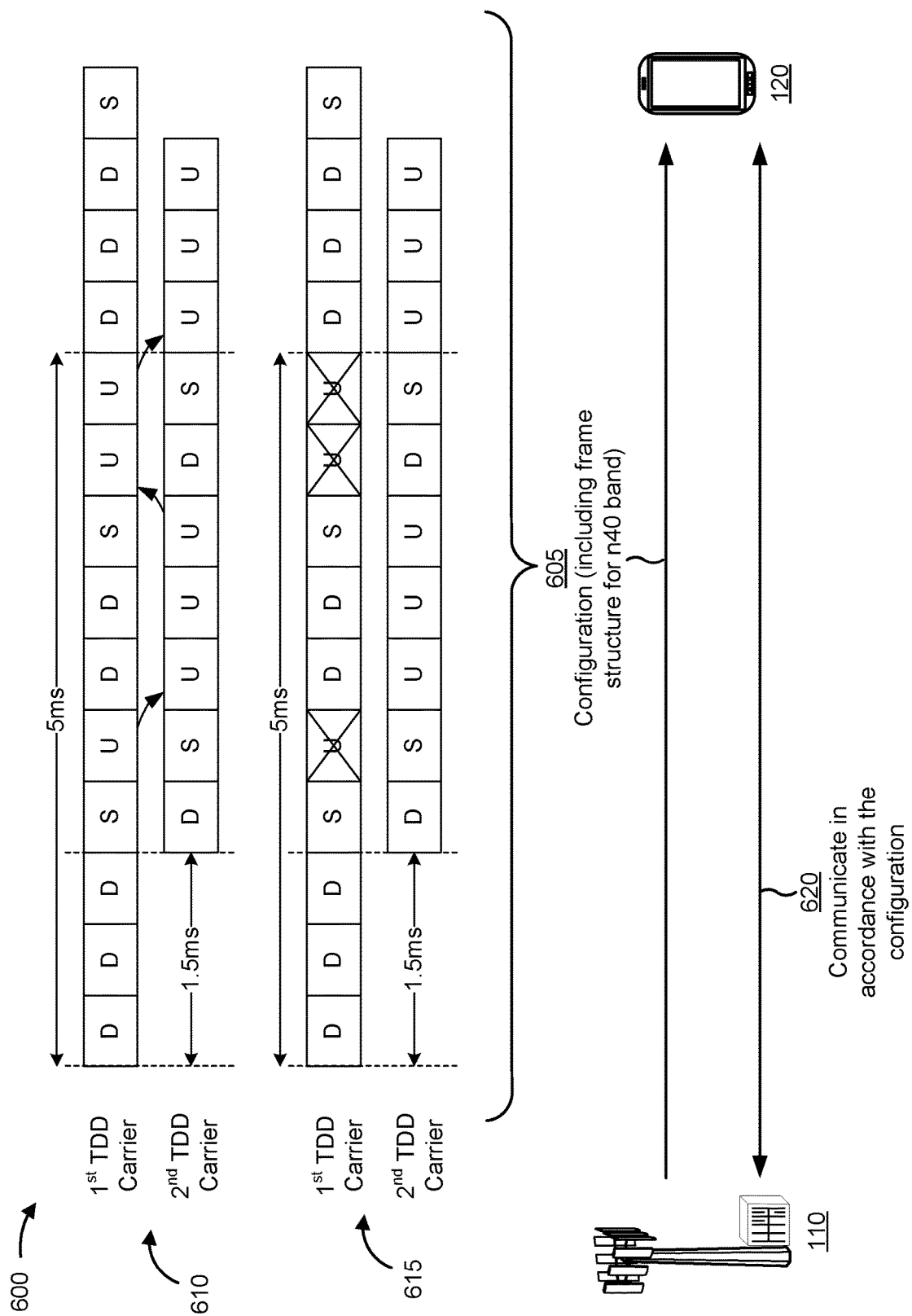

FIG. 6 is a diagram illustrating an example 600 associated with UL CA of two TDD carriers, in accordance with various aspects of the present disclosure. As shown in FIG. 6, a base station 110 and a UE 120 may communicate with one another.

As shown by reference number 605, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 2.5 millisecond single cycle slot sequence. The slot sequence may include a first DL sequence. In some aspects, the first DL sequence may include one DL slot. A first special sequence may follow the first DL sequence. In some aspects, the first special sequence may include one special slot. A first UL sequence may follow the first special sequence. In some aspects, the first UL sequence may include three consecutive UL slots. In some aspects, the frame structure may include a 1.5 millisecond offset preceding the first DL sequence.

As shown, the frame structure corresponding to the first TDD carrier may include a 2.5 millisecond dual cycle slot sequence. The slot sequence may include a second DL sequence. In some aspects, the second DL sequence may include three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 610, the configuration may support cell center communications with transmission switching. As shown, the UL CA may provide eleven slots that support DL transmissions and nine slots that support UL transmissions. As shown by reference number 615, the configuration may support cell edge communications without transmission switching. As shown, the UL CA may provide eleven slots that support DL transmissions and six slots that support UL transmissions.

As shown by reference number 620, the base station 110 and the UE 120 may communicate with one another in accordance with the configuration.

As indicated above, FIG. 6 is provided as an example. Other examples may differ from what is described with respect to FIG. 6.

Figure 7:
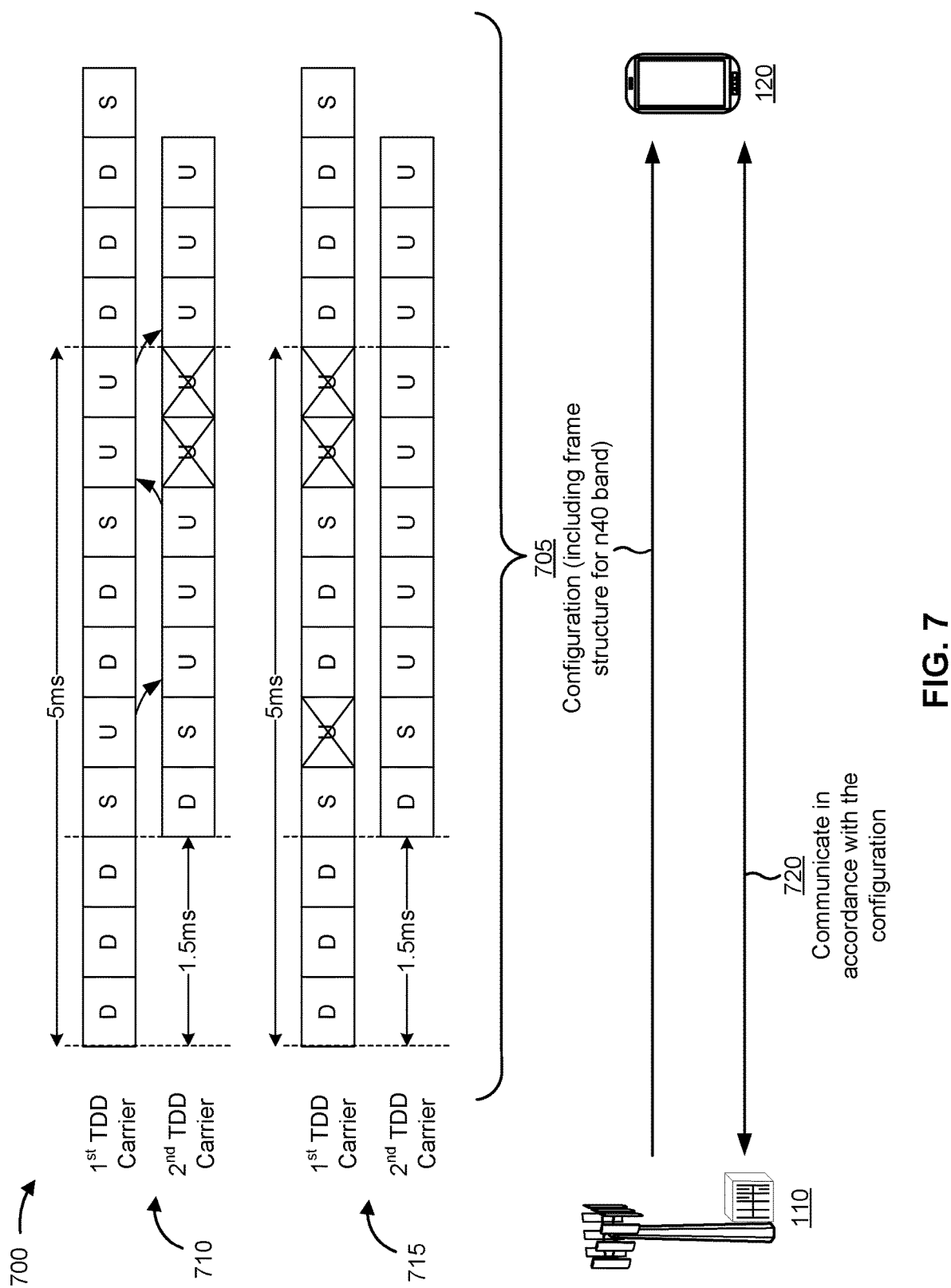

FIG. 7 is a diagram illustrating an example 700 associated with UL CA of two TDD carriers, in accordance with various aspects of the present disclosure. As shown in FIG. 7, a base station 110 and a UE 120 may communicate with one another.

As shown by reference number 705, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 5 millisecond single cycle slot sequence. The slot sequence may include a first DL sequence. In some aspects, the first DL sequence may include one DL slot. A first special sequence may follow the first DL sequence. In some aspects, the first special sequence may include one special slot. A first UL sequence may follow the first special sequence. In some aspects, the first UL sequence may include eight consecutive UL slots. In some aspects, the frame structure may include a 1.5 millisecond offset preceding the first DL sequence.

As shown, the frame structure corresponding to the first TDD carrier may include a 2.5 millisecond dual cycle slot sequence. The slot sequence may include a second DL sequence. In some aspects, the second DL sequence may include three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 710, the configuration may support cell center communications with transmission switching. As shown, the UL CA may provide nine slots that support DL transmissions and nine slots that support UL transmissions. As shown by reference number 715, the configuration may support cell edge communications without transmission switching. As shown, the UL CA may provide eight slots that support DL transmissions and eight slots that support UL transmissions.

As shown by reference number 720, the base station 110 and the UE 120 may communicate with one another in accordance with the configuration.

As indicated above, FIG. 7 is provided as an example. Other examples may differ from what is described with respect to FIG. 7.

Figure 8:
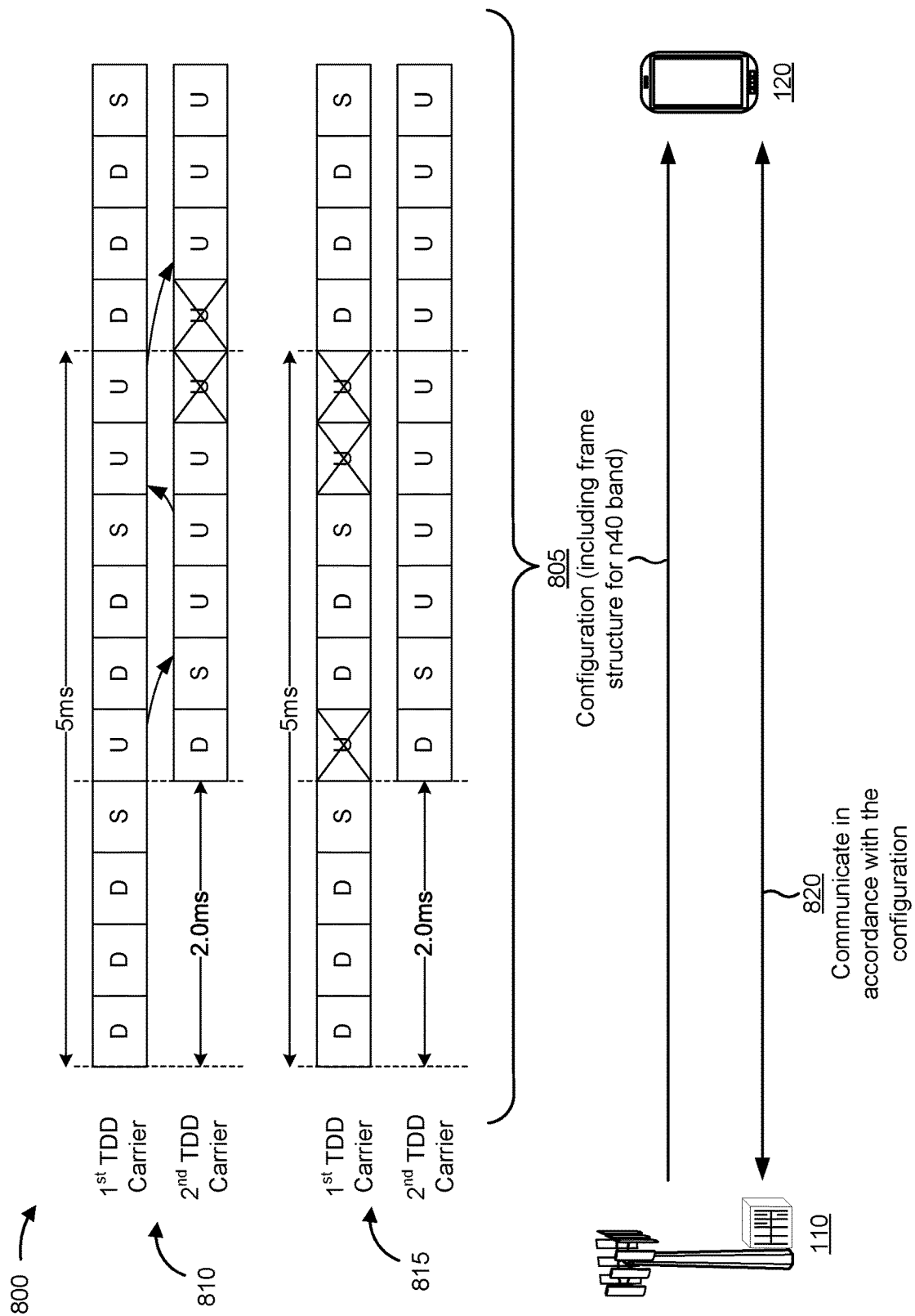

FIG. 8 is a diagram illustrating an example 800 associated with UL CA of two TDD carriers, in accordance with various aspects of the present disclosure. As shown in FIG. 8, a base station 110 and a UE 120 may communicate with one another.

As shown by reference number 805, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 5 millisecond single cycle slot sequence. The slot sequence may include a first DL sequence. In some aspects, the first DL sequence may include one DL slot. A first special sequence may follow the first DL sequence. In some aspects, the first special sequence may include one special slot. A first UL sequence may follow the first special sequence. In some aspects, the first UL sequence may include eight consecutive UL slots. In some aspects, the frame structure may include a 2 millisecond offset preceding the first DL sequence.

As shown, the frame structure corresponding to the first TDD carrier may include a 2.5 millisecond dual cycle slot sequence including a second DL sequence including three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 810, the configuration may support cell center communications with transmission switching. As shown, the UL CA may provide nine slots that support DL transmissions and nine slots that support UL transmissions. As shown by reference number 815, the configuration may support cell edge communications without transmission switching. As shown, the UL CA may provide eight slots that support DL transmissions and eight slots that support UL transmissions.

As shown by reference number 820, the base station 110 and the UE 120 may communicate with one another in accordance with the configuration.

As indicated above, FIG. 8 is provided as an example. Other examples may differ from what is described with respect to FIG. 8.

Figure 9:
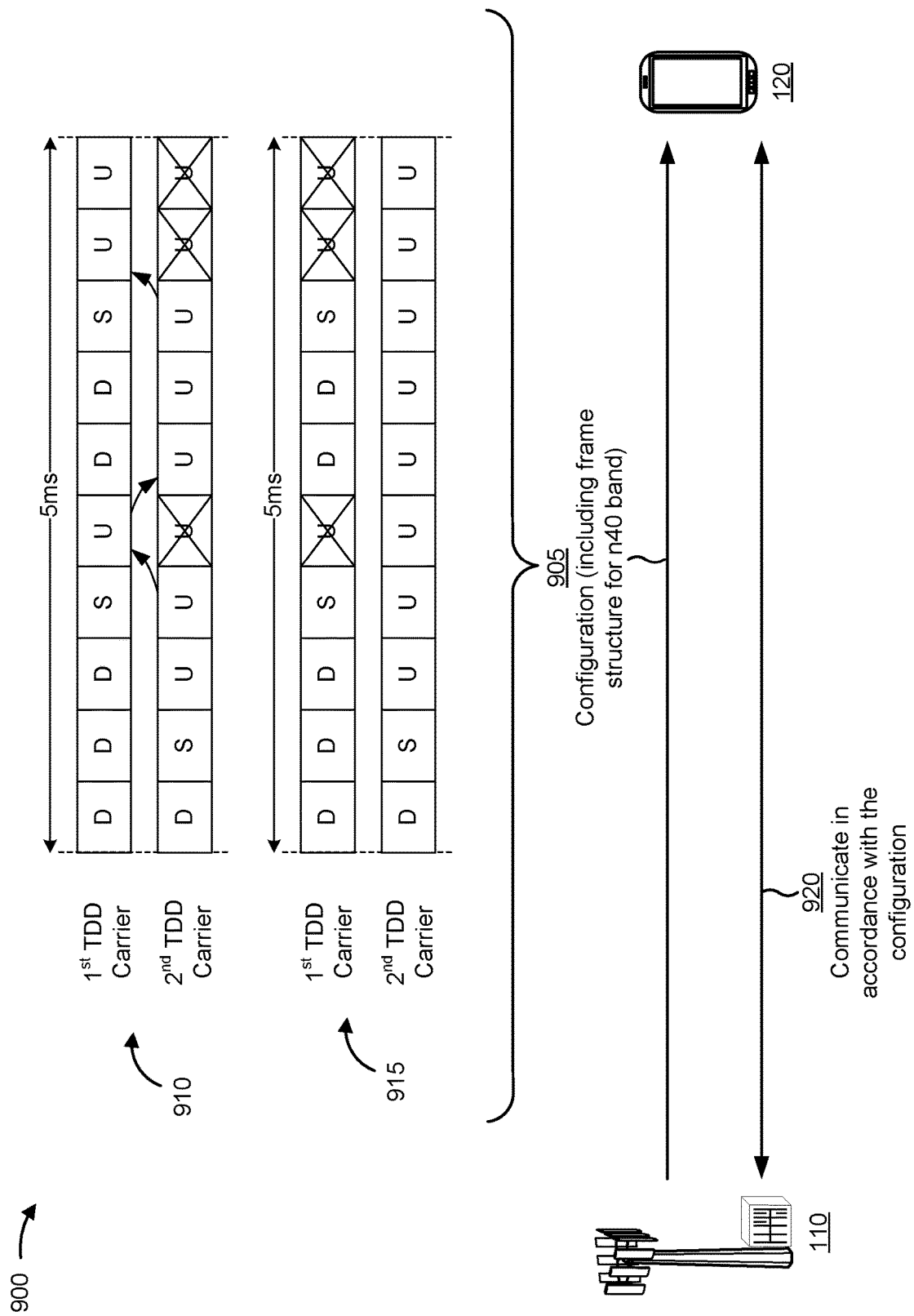

FIG. 9 is a diagram illustrating an example 900 associated with UL CA of two TDD carriers, in accordance with various aspects of the present disclosure. As shown in FIG. 9, a base station 110 and a UE 120 may communicate with one another.

As shown by reference number 905, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 5 millisecond single cycle slot sequence. The slot sequence may include a first DL sequence. In some aspects, the first DL sequence may include one DL slot. A first special sequence may follow the first DL sequence. In some aspects, the first special sequence may include one special slot. A first UL sequence may follow the first special sequence. In some aspects, the first UL sequence may include eight consecutive UL slots. In some aspects, the frame structure does not include an offset.

As shown, the frame structure corresponding to the first TDD carrier may include a 2.5 millisecond dual cycle slot sequence including a second DL sequence including three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 910, the configuration may support cell center communications with transmission switching. As shown, the UL CA may provide nine slots that support DL transmissions and eight slots that support UL transmissions. As shown by reference number 915, the configuration may support cell edge communications without transmission switching. As shown, the UL CA may provide nine slots that support DL transmissions and eight slots that support UL transmissions.

As shown by reference number 920, the base station 110 and the UE 120 may communicate with one another in accordance with the configuration.

As indicated above, FIG. 9 is provided as an example. Other examples may differ from what is described with respect to FIG. 9.

Figure 10:
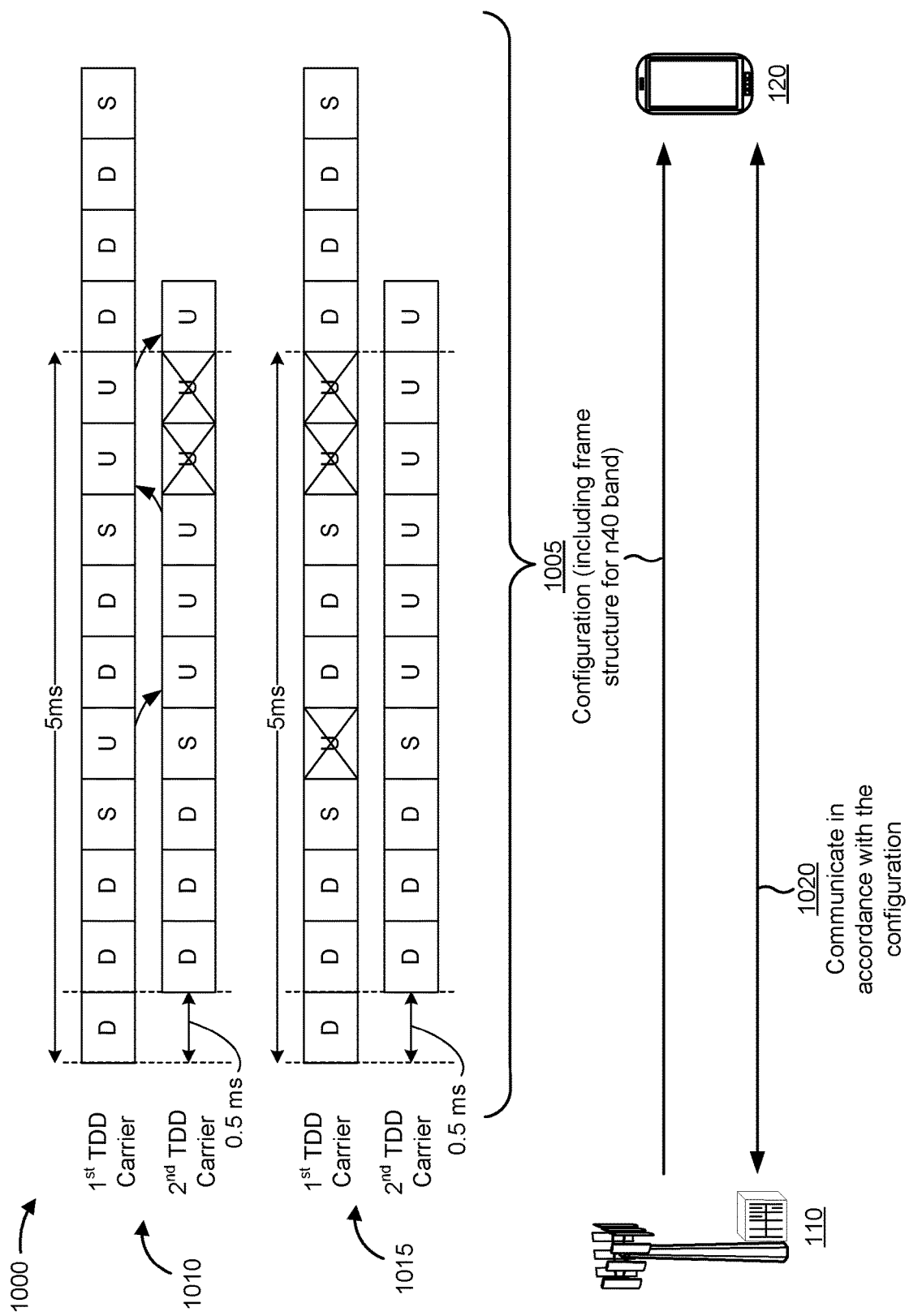

FIG. 10 is a diagram illustrating an example 1000 associated with UL CA of two TDD carriers, in accordance with various aspects of the present disclosure. As shown in FIG. 10, a base station 110 and a UE 120 may communicate with one another.

As shown by reference number 1005, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 5 millisecond single cycle slot sequence. The slot sequence may include a first DL sequence. In some aspects, the first DL sequence may include three consecutive DL slots. A first special sequence may follow the first DL sequence. In some aspects, the first special sequence may include one special slot. A first UL sequence may follow the first special sequence. In some aspects, the first UL sequence may include six consecutive UL slots. In some aspects, the frame structure may include a 0.5 millisecond offset preceding the first DL sequence.

As shown, the frame structure corresponding to the first TDD carrier may include a 2.5 millisecond dual cycle slot sequence including a second DL sequence including three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 1010, the configuration may support cell center communications with transmission switching. As shown, the UL CA may provide eleven slots that support DL transmissions and seven slots that support UL transmissions. As shown by reference number 1015, the configuration may support cell edge communications without transmission switching. As shown, the UL CA may provide eleven slots that support DL transmissions and six slots that support UL transmissions.

As shown by reference number 1020, the base station 110 and the UE 120 may communicate with one another in accordance with the configuration.

As indicated above, FIG. 10 is provided as an example. Other examples may differ from what is described with respect to FIG. 10.

Figure 11:
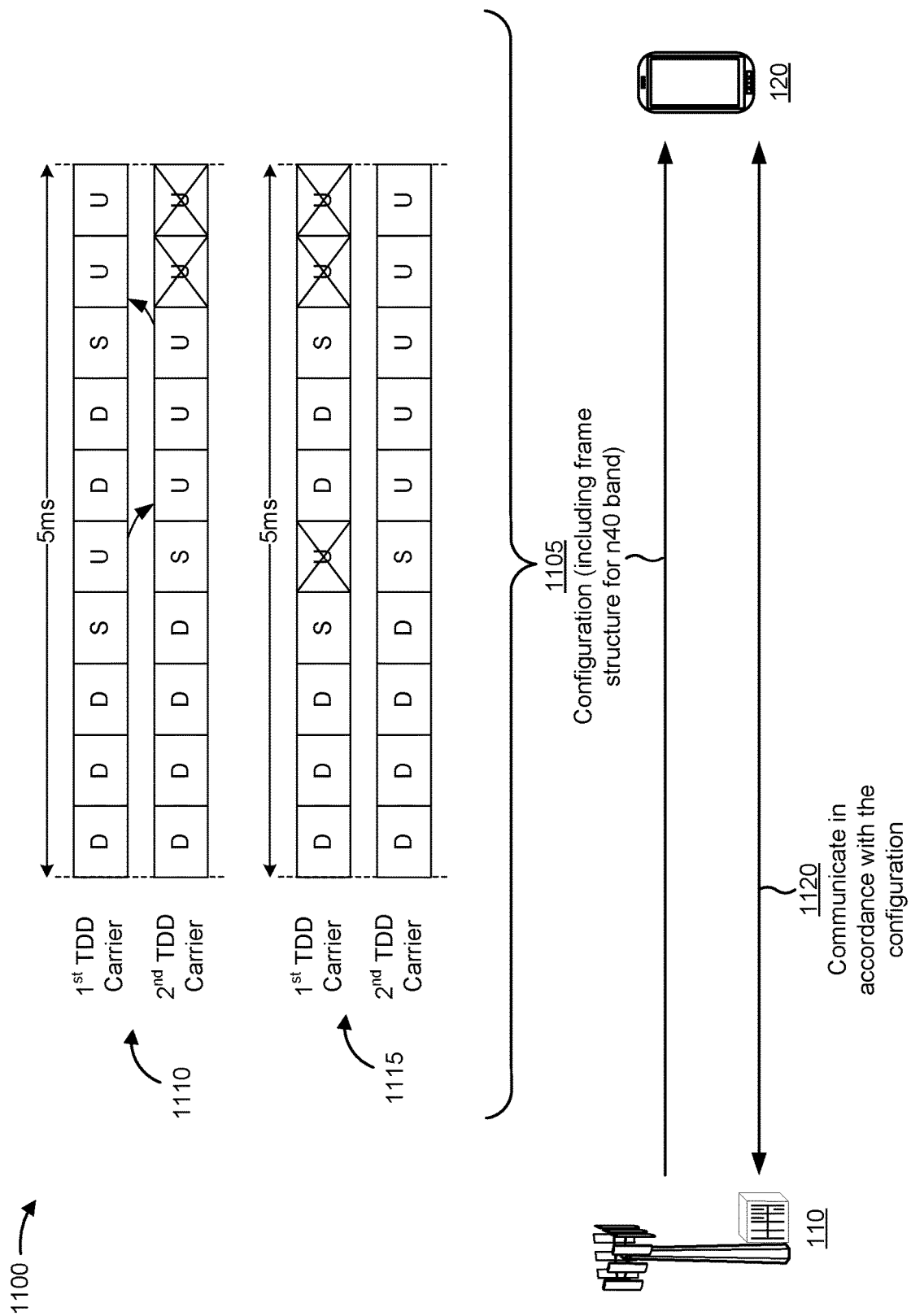

FIG. 11 is a diagram illustrating an example 1100 associated with UL CA of two TDD carriers, in accordance with various aspects of the present disclosure. As shown in FIG. 11, a base station 110 and a UE 120 may communicate with one another.

As shown by reference number 1105, the base station 110 may transmit, and the UE 120 may receive, a configuration for TDMed UL CA of a first TDD carrier with a second TDD carrier. In some aspects, the configuration may indicate a frame structure corresponding to the first TDD carrier and a frame structure corresponding to the second TDD carrier.

As shown, the frame structure corresponding to the second TDD carrier may include a 5 millisecond single cycle slot sequence. The slot sequence may include a first DL sequence. In some aspects, the first DL sequence may include four consecutive DL slots. A first special sequence may follow the first DL sequence. In some aspects, the first special sequence may include one special slot. A first UL sequence may follow the first special sequence. In some aspects, the first UL sequence may include five consecutive UL slots. In some aspects, the frame structure does not include an offset preceding the first DL sequence.

As shown, the frame structure corresponding to the first TDD carrier may include a 2.5 millisecond dual cycle slot sequence including a second DL sequence including three consecutive DL slots. A second special sequence may follow the second DL sequence. In some aspects, the second special sequence may include one special slot. A second UL sequence may follow the second special sequence. In some aspects, the second UL sequence may include one UL slot. A third DL sequence may follow the second UL sequence. In some aspects, the third DL sequence may include two consecutive DL slots. A third special sequence may follow the third DL sequence. In some aspects, the third special sequence may include one special slot. A third UL sequence may follow the third special sequence. In some aspects, the third UL sequence may include two consecutive UL slots.

As shown by reference number 1110, the configuration may support cell center communications with transmission switching. As shown, the UL CA may provide twelve slots that support DL transmissions and six slots that support UL transmissions. As shown by reference number 1115, the configuration may support cell edge communications without transmission switching. As shown, the UL CA may provide twelve slots that support DL transmissions and five slots that support UL transmissions.

As shown by reference number 1120, the base station 110 and the UE 120 may communicate with one another in accordance with the configuration.

As indicated above, FIG. 11 is provided as an example. Other examples may differ from what is described with respect to FIG. 11.

Figure 12:
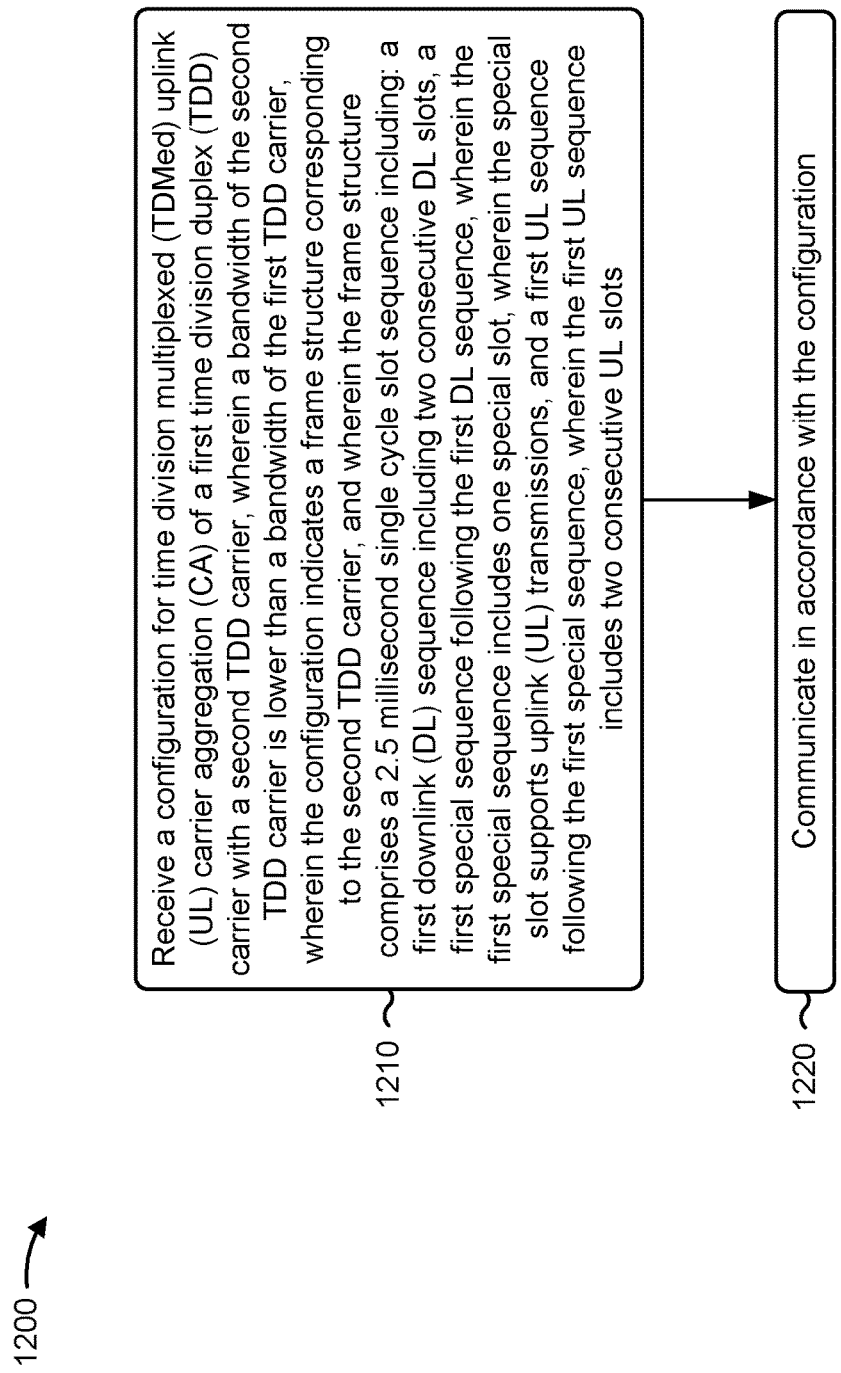
FIGS. 12-23 are diagrams illustrating example processes associated with frame structures for UL CA of two TDD carriers, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 and/or the like) performs operations associated with frame structures for UL CA of two TDD carriers.

As shown in FIG. 12, in some aspects, process 1200 may include receiving a configuration for TMDed UL CA of a first TDD carrier with a second TDD carrier, where a bandwidth of the second TDD carrier is lower than a bandwidth of the first TDD carrier, where the configuration indicates a frame structure corresponding to the second TDD carrier, and where the frame structure comprises a 2.5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots (block 1210). For example, the UE (e.g., using receive processor 258, controller/processor 280, memory 282, and/or the like) may receive a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 2.5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots.

As further shown in FIG. 12, in some aspects, process 1200 may include communicating in accordance with the configuration (block 1220). For example, the UE (e.g., using receive processor 258, transmit processor 264, controller/processor 280, memory 282, and/or the like) may communicate in accordance with the configuration, as described above.

Process 1200 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the configuration supports cell center communications with transmission switching, and the UL CA provides twelve slots that support DL transmissions and seven slots that support UL transmissions.

In a sixth aspect, alone or in combination with one or more of the first through fifth aspects, the configuration supports cell edge communications without transmission switching, and the UL CA provides twelve slots that support DL transmissions and four slots that support UL transmissions.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
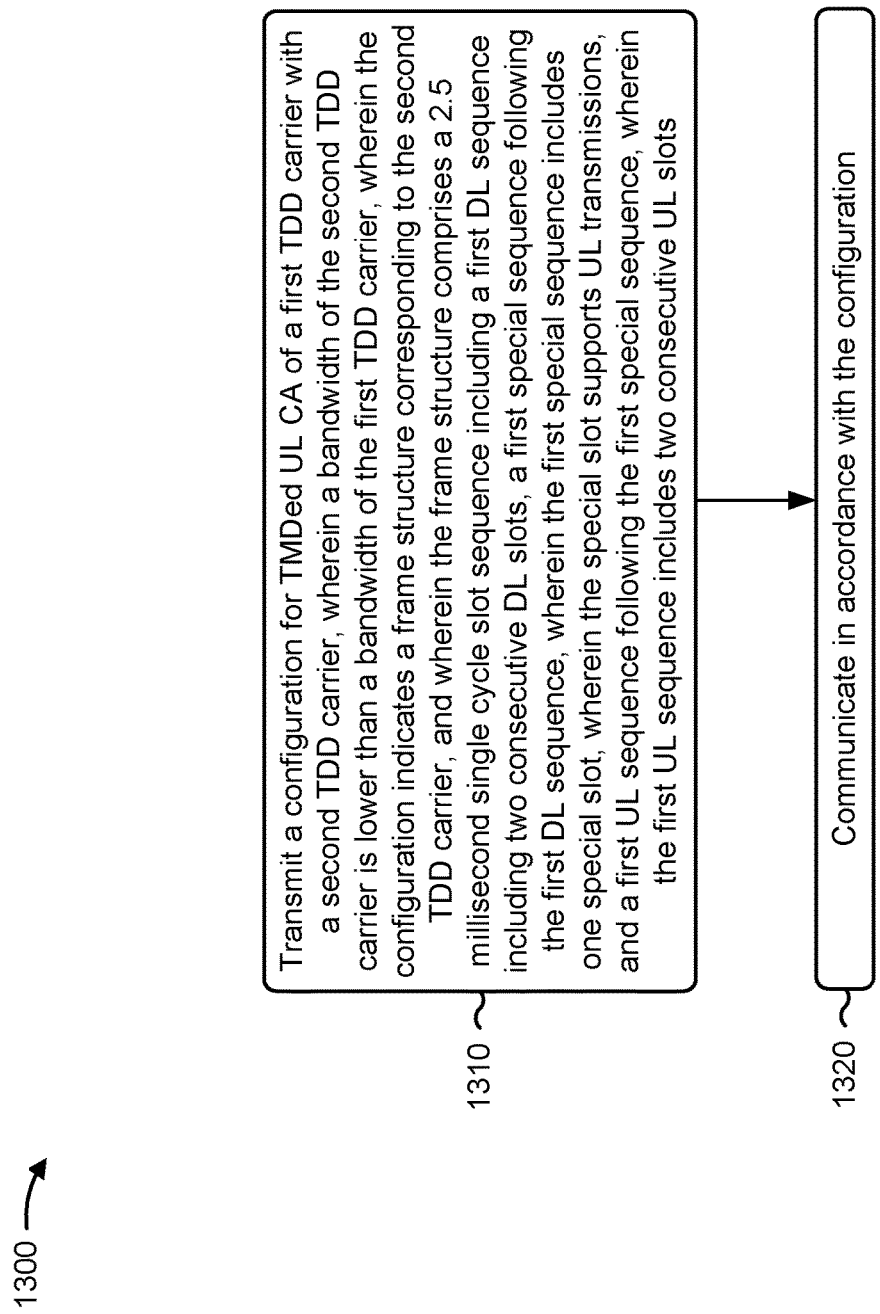

FIG. 13 is a diagram illustrating an example process 1300 performed, for example, by a base station, in accordance with various aspects of the present disclosure. Example process 1300 is an example where the base station (e.g., base station 110 and/or the like) performs operations associated with frame structures for UL CA of two TDD carriers.

As shown in FIG. 13, in some aspects, process 1300 may include transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots (block 1310). For example, the base station (e.g., using transmit processor 220, controller/processor 240, memory 242, and/or the like) may transmit a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 2.5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes two consecutive UL slots.

As further shown in FIG. 13, in some aspects, process 1300 may include communicating in accordance with the configuration (block 1320). For example, the base station (e.g., using transmit processor 220, receive processor 238, controller/processor 240, memory 242, and/or the like) may communicate in accordance with the configuration, as described above.

Process 1300 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the configuration supports cell center communications with transmission switching, and the UL CA provides twelve slots that support DL transmissions and seven slots that support UL transmissions.

In a sixth aspect, alone or in combination with one or more of the first through fifth aspects, the configuration supports cell edge communications without transmission switching, and the UL CA provides twelve slots that support DL transmissions and four slots that support UL transmissions.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
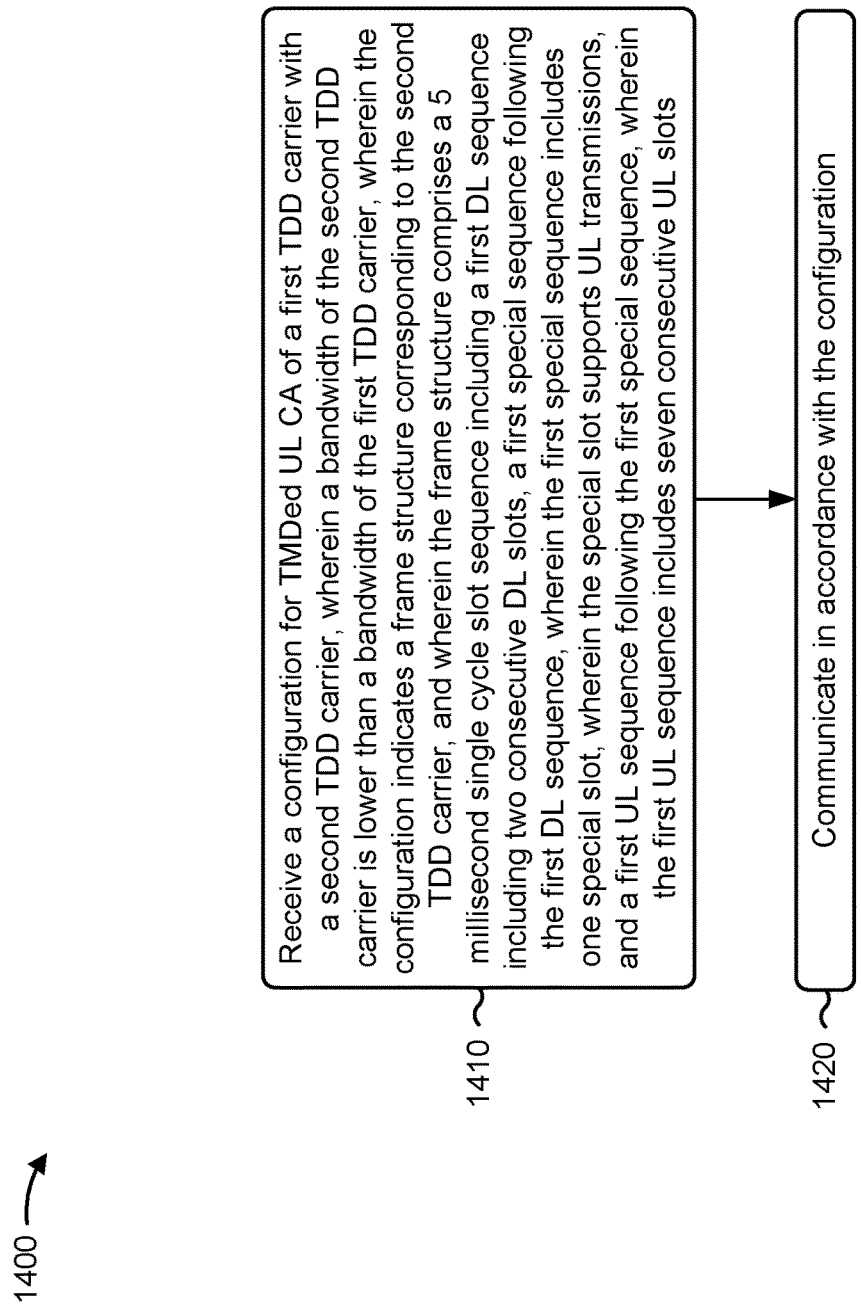

FIG. 14 is a diagram illustrating an example process 1400 performed, for example, by a UE, in accordance with various aspects of the present disclosure. Example process 1400 is an example where the UE (e.g., UE 120 and/or the like) performs operations associated with frame structures for UL CA of two TDD carriers.

As shown in FIG. 14, in some aspects, process 1400 may include receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots (block 1410). For example, the UE (e.g., using receive processor 258, controller/processor 280, memory 282, and/or the like) may receive a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots.

As further shown in FIG. 14, in some aspects, process 1400 may include communicating in accordance with the configuration (block 1420). For example, the UE (e.g., using receive processor 258, transmit processor 264, controller/processor 280, memory 282, and/or the like) may communicate in accordance with the configuration, as described above.

Process 1400 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the configuration supports cell center communications with transmission switching, and the UL CA provides ten slots that support DL transmissions and eight slots that support UL transmissions.

In a sixth aspect, alone or in combination with one or more of the first through fifth aspects, the configuration supports cell edge communications without transmission switching, and the UL CA provides ten slots that support DL transmissions and seven slots that support UL transmissions.

In a seventh aspect, alone or in combination with one or more of the first through sixth aspects, the frame structure does not include an offset.

In an eighth aspect, alone or in combination with one or more of the first through seventh aspects, the configuration supports cell center communications with transmission switching, and the UL CA provides ten slots that support DL transmissions and seven slots that support UL transmissions.

In a ninth aspect, alone or in combination with one or more of the first through eighth aspects, the configuration supports cell edge communications without transmission switching, and the UL CA provides ten slots that support DL transmissions and seven slots that support UL transmissions.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
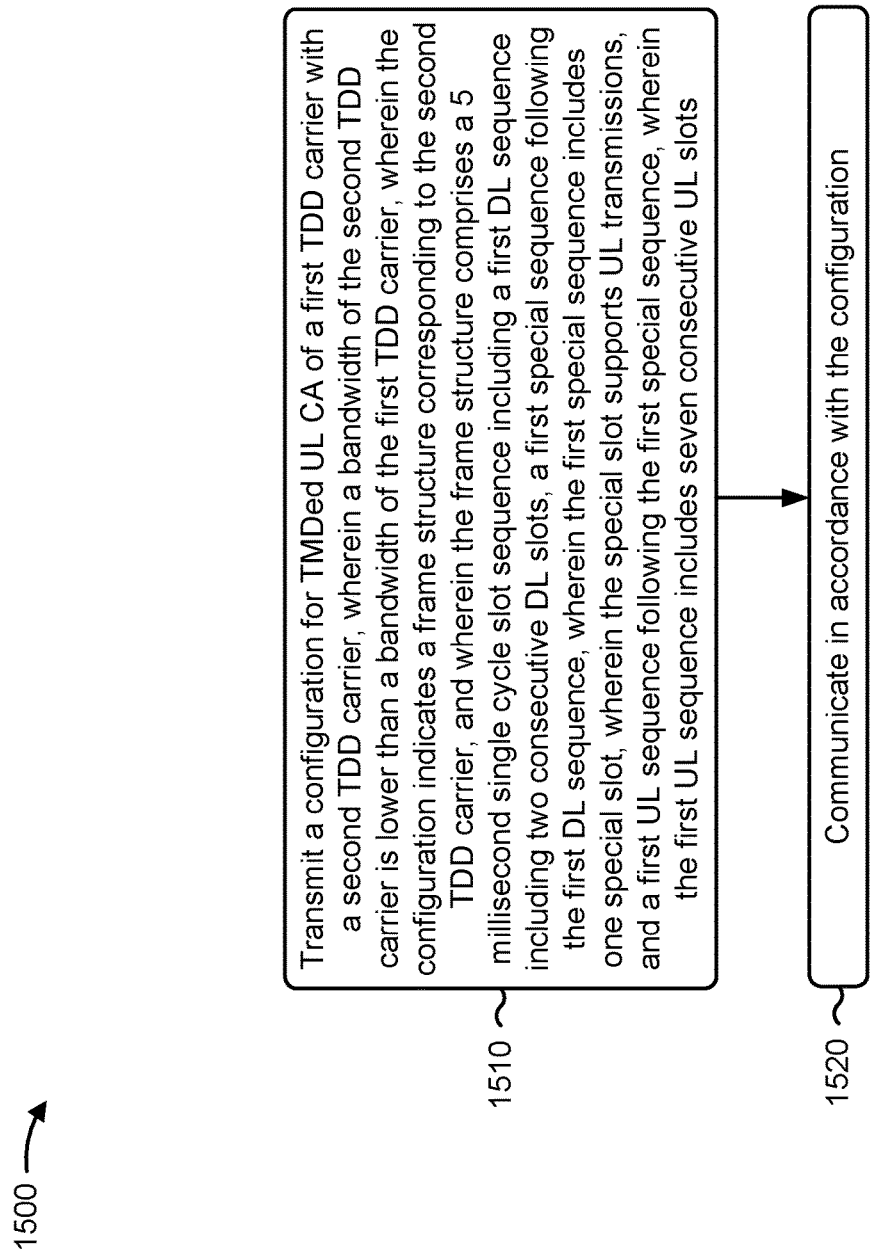

FIG. 15 is a diagram illustrating an example process 1500 performed, for example, by a base station, in accordance with various aspects of the present disclosure. Example process 1500 is an example where the base station (e.g., base station 110 and/or the like) performs operations associated with frame structures for UL CA of two TDD carriers.

As shown in FIG. 15, in some aspects, process 1500 may include transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots (block 1510). For example, the base station (e.g., using transmit processor 220, controller/processor 240, memory 242, and/or the like) may transmit a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including two consecutive DL slots, a first special sequence following the first DL sequence, wherein the first special sequence includes one special slot, wherein the special slot supports UL transmissions, and a first UL sequence following the first special sequence, wherein the first UL sequence includes seven consecutive UL slots.

As further shown in FIG. 15, in some aspects, process 1500 may include communicating in accordance with the configuration (block 1520). For example, the base station (e.g., using transmit processor 220, receive processor 238, controller/processor 240, memory 242, and/or the like) may communicate in accordance with the configuration, as described above.

Process 1500 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the configuration supports cell center communications with transmission switching, and the UL CA provides ten slots that support DL transmissions and eight slots that support UL transmissions.

In a sixth aspect, alone or in combination with one or more of the first through fifth aspects, the configuration supports cell edge communications without transmission switching, and the UL CA provides ten slots that support DL transmissions and seven slots that support UL transmissions.

In a seventh aspect, alone or in combination with one or more of the first through sixth aspects, the frame structure does not include an offset.

In an eighth aspect, alone or in combination with one or more of the first through seventh aspects, the configuration supports cell center communications with transmission switching, and the UL CA provides ten slots that support DL transmissions and seven slots that support UL transmissions.

In a ninth aspect, alone or in combination with one or more of the first through eighth aspects, the configuration supports cell edge communications without transmission switching, and the UL CA provides ten slots that support DL transmissions and seven slots that support UL transmissions.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
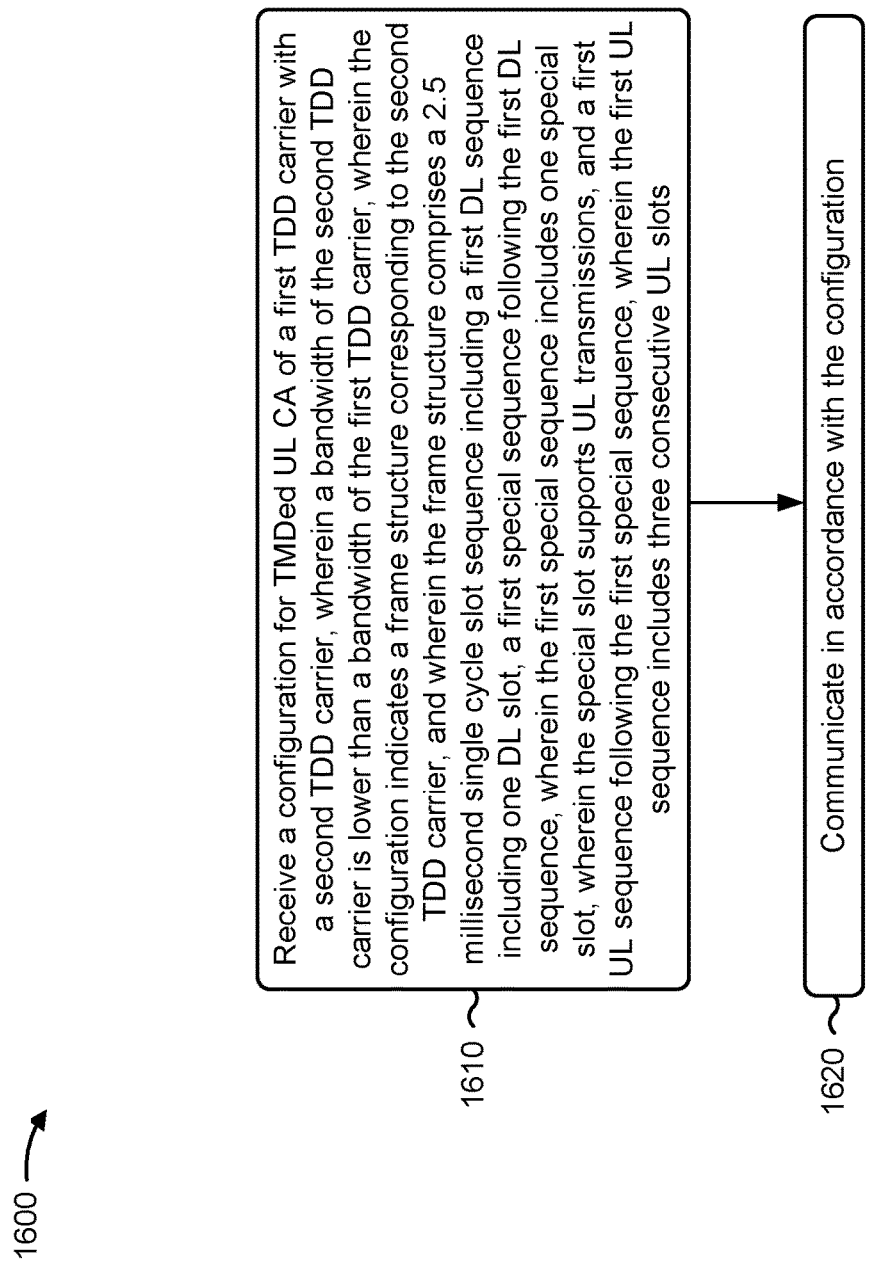

FIG. 16 is a diagram illustrating an example process 1600 performed, for example, by a UE, in accordance with various aspects of the present disclosure. Example process 1600 is an example where the UE (e.g., UE 120 and/or the like) performs operations associated with frame structures for UL CA of two TDD carriers.

As shown in FIG. 16, in some aspects, process 1600 may include receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots (block 1610). For example, the UE (e.g., using receive processor 258, controller/processor 280, memory 282, and/or the like) may receive a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 2.5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots.

As further shown in FIG. 16, in some aspects, process 1600 may include communicating in accordance with the configuration (block 1620). For example, the UE (e.g., using receive processor 258, transmit processor 264, controller/processor 280, memory 282, and/or the like) may communicate in accordance with the configuration, as described above.

Process 1600 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the configuration supports cell center communications with transmission switching, and the UL CA provides eleven slots that support DL transmissions and nine slots that support UL transmissions.

In a sixth aspect, alone or in combination with one or more of the first through fifth aspects, the configuration supports cell edge communications without transmission switching, and the UL CA provides eleven slots that support DL transmissions and six slots that support UL transmissions.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
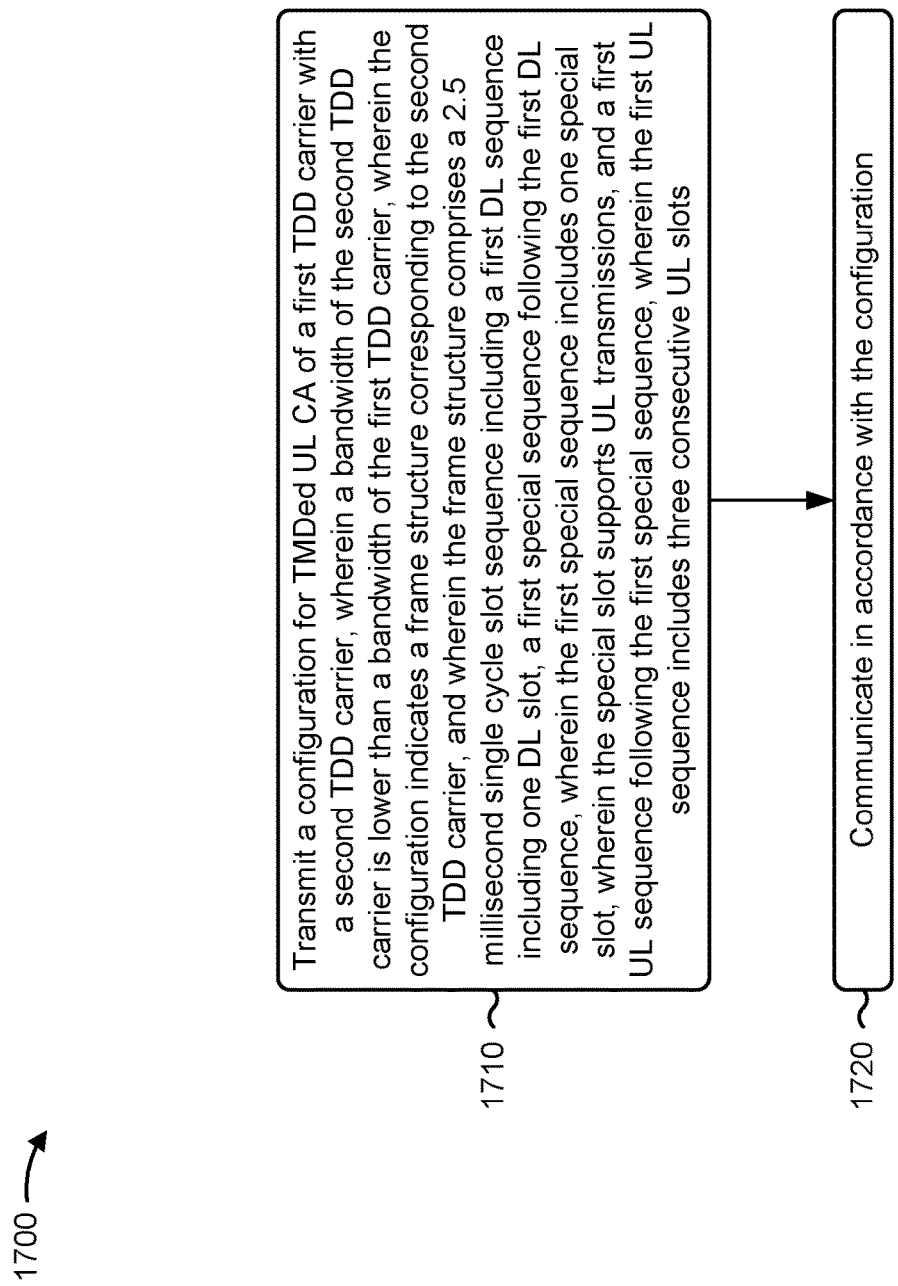

FIG. 17 is a diagram illustrating an example process 1700 performed, for example, by a base station, in accordance with various aspects of the present disclosure. Example process 1700 is an example where the base station (e.g., base station 110 and/or the like) performs operations associated with frame structures for UL CA of two TDD carriers.

As shown in FIG. 17, in some aspects, process 1700 may include transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 2.5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots (block 1710). For example, the base station (e.g., using transmit processor 220, controller/processor 240, memory 242, and/or the like) may transmit a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 2.5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes three consecutive UL slots.

As further shown in FIG. 17, in some aspects, process 1700 may include communicating in accordance with the configuration (block 1720). For example, the base station (e.g., using transmit processor 220, receive processor 238, controller/processor 240, memory 242, and/or the like) may communicate in accordance with the configuration, as described above.

Process 1700 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the configuration supports cell center communications with transmission switching, and the UL CA provides eleven slots that support DL transmissions and nine slots that support UL transmissions.

In a sixth aspect, alone or in combination with one or more of the first through fifth aspects, the configuration supports cell edge communications without transmission switching, and the UL CA provides eleven slots that support DL transmissions and six slots that support UL transmissions.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
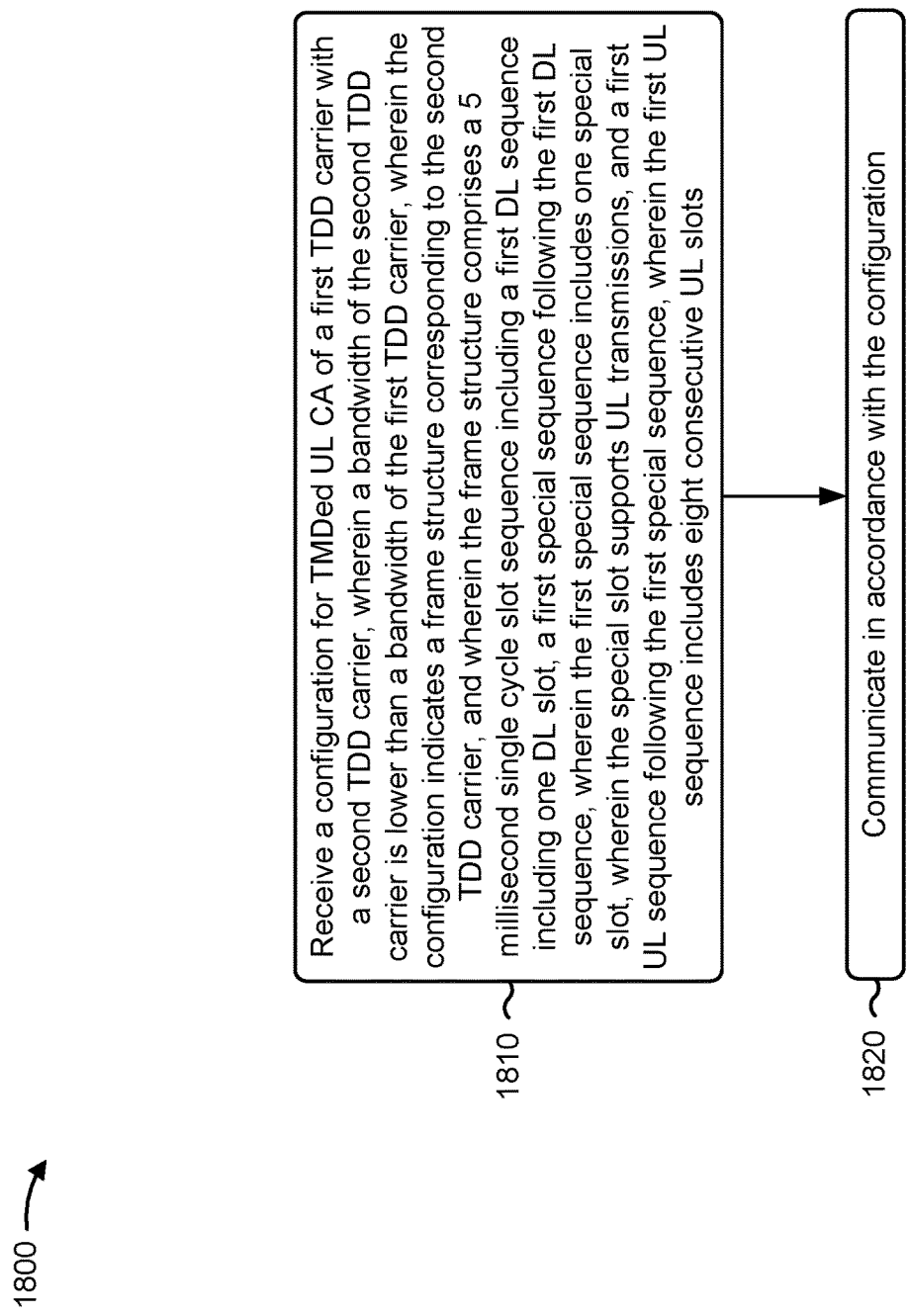

FIG. 18 is a diagram illustrating an example process 1800 performed, for example, by a UE, in accordance with various aspects of the present disclosure. Example process 1800 is an example where the UE (e.g., UE 120 and/or the like) performs operations associated with frame structures for UL CA of two TDD carriers.

As shown in FIG. 18, in some aspects, process 1800 may include receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots (block 1810). For example, the UE (e.g., using receive processor 258, controller/processor 280, memory 282, and/or the like) may receive a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots.

As further shown in FIG. 18, in some aspects, process 1800 may include communicating in accordance with the configuration (block 1820). For example, the UE (e.g., using receive processor 258, transmit processor 264, controller/processor 280, memory 282, and/or the like) may communicate in accordance with the configuration, as described above.

Process 1800 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the frame structure further includes a 2 millisecond offset preceding the first DL sequence.

In a sixth aspect, alone or in combination with one or more of the first through fifth aspects, the configuration supports cell center communications with transmission switching, and the UL CA provides nine slots that support DL transmissions and nine slots that support UL transmissions.

In a seventh aspect, alone or in combination with one or more of the first through sixth aspects, the configuration supports cell edge communications without transmission switching, and the UL CA provides eight slots that support DL transmissions and eight slots that support UL transmissions.

In an eighth aspect, alone or in combination with one or more of the first through seventh aspects, the frame structure does not include an offset.

In a ninth aspect, alone or in combination with one or more of the first through eighth aspects, the configuration supports cell center communications with transmission switching, and the UL CA provides nine slots that support DL transmissions and eight slots that support UL transmissions.

In a tenth aspect, alone or in combination with one or more of the first through ninth aspects, the configuration supports cell edge communications without transmission switching, and the UL CA provides nine slots that support DL transmissions and eight slots that support UL transmissions.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
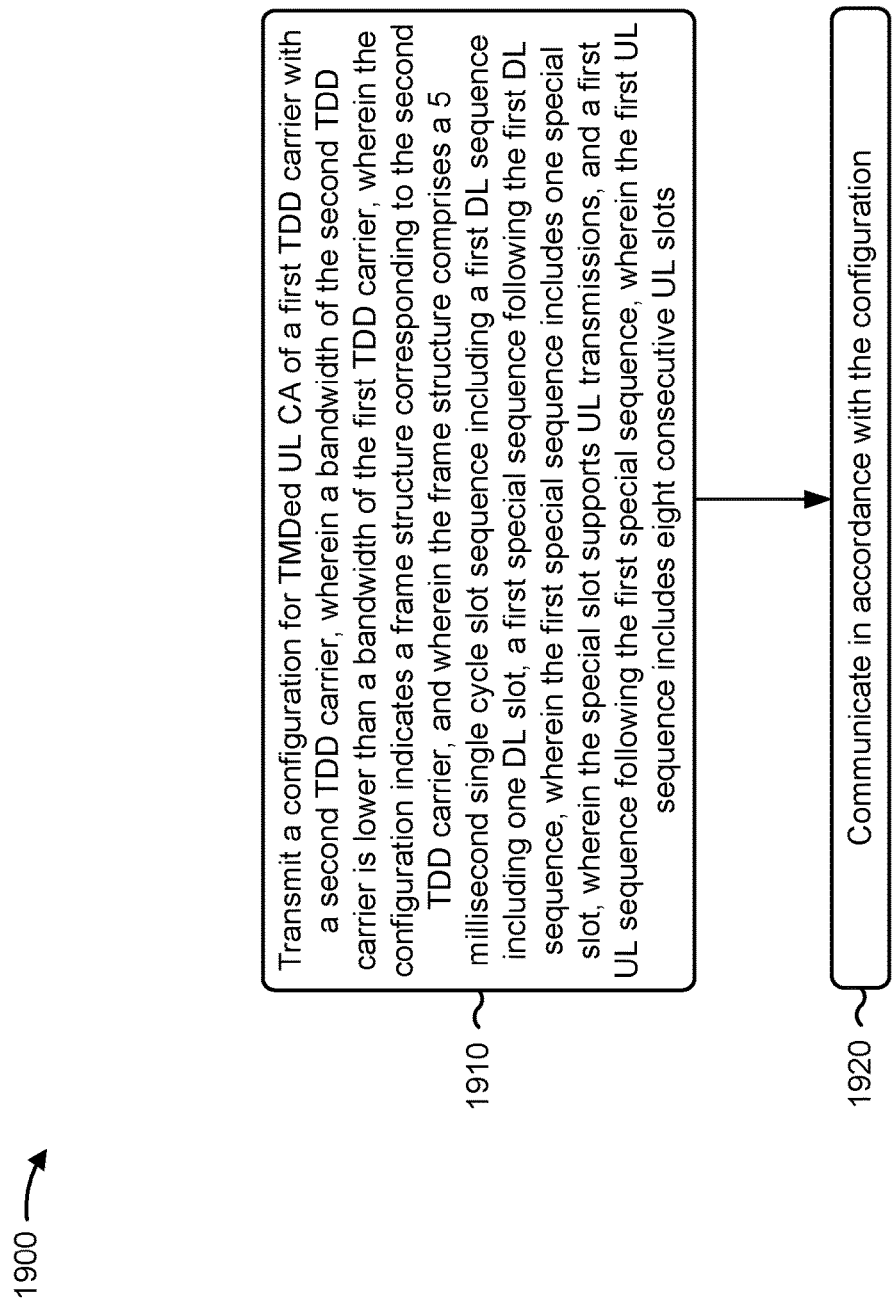

FIG. 19 is a diagram illustrating an example process 1900 performed, for example, by a base station, in accordance with various aspects of the present disclosure. Example process 1900 is an example where the base station (e.g., base station 110 and/or the like) performs operations associated with frame structures for UL CA of two TDD carriers.

As shown in FIG. 19, in some aspects, process 1900 may include transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots (block 1910). For example, the base station (e.g., using transmit processor 220, controller/processor 240, memory 242, and/or the like) may transmit a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including one DL slot, a first special sequence following the first DL sequence, wherein the first special sequence includes one special slot, wherein the special slot supports UL transmissions, and a first UL sequence following the first special sequence, wherein the first UL sequence includes eight consecutive UL slots.

As further shown in FIG. 19, in some aspects, process 1900 may include communicating in accordance with the configuration (block 1920). For example, the base station (e.g., using transmit processor 220, receive processor 238, controller/processor 240, memory 242, and/or the like) may communicate in accordance with the configuration, as described above.

Process 1900 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 1.5 millisecond offset preceding the first DL sequence.

In a fifth aspect, alone or in combination with one or more of the first through fourth aspects, the frame structure further includes a 2 millisecond offset preceding the first DL sequence.

In a sixth aspect, alone or in combination with one or more of the first through fifth aspects, the configuration supports cell center communications with transmission switching, and the UL CA provides nine slots that support DL transmissions and nine slots that support UL transmissions.

In a seventh aspect, alone or in combination with one or more of the first through sixth aspects, the configuration supports cell edge communications without transmission switching, and the UL CA provides eight slots that support DL transmissions and eight slots that support UL transmissions.

In an eighth aspect, alone or in combination with one or more of the first through seventh aspects, the frame structure does not include an offset.

In a ninth aspect, alone or in combination with one or more of the first through eighth aspects, the configuration supports cell center communications with transmission switching, and the UL CA provides nine slots that support DL transmissions and eight slots that support UL transmissions.

In a tenth aspect, alone or in combination with one or more of the first through ninth aspects, the configuration supports cell edge communications without transmission switching, and the UL CA provides nine slots that support DL transmissions and eight slots that support UL transmissions.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
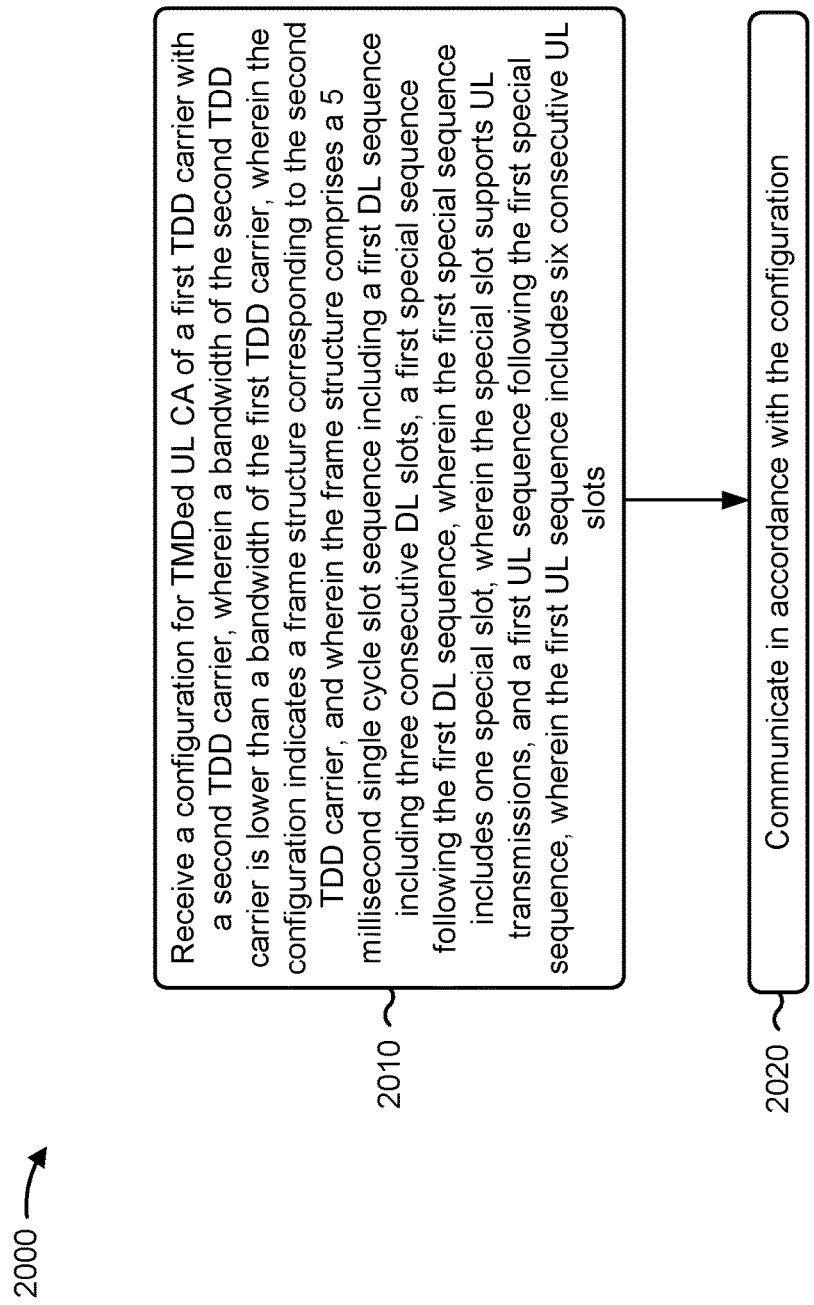

FIG. 20 is a diagram illustrating an example process 2000 performed, for example, by a UE, in accordance with various aspects of the present disclosure. Example process 2000 is an example where the UE (e.g., UE 120 and/or the like) performs operations associated with frame structures for UL CA of two TDD carriers.

As shown in FIG. 20, in some aspects, process 2000 may include receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots (block 2010). For example, the UE (e.g., using receive processor 258, controller/processor 280, memory 282, and/or the like) may receive a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots.

As further shown in FIG. 20, in some aspects, process 2000 may include communicating in accordance with the configuration (block 2020). For example, the UE (e.g., using receive processor 258, transmit processor 264, controller/processor 280, memory 282, and/or the like) may communicate in accordance with the configuration, as described above.

Process 2000 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 0.5 millisecond offset preceding the first DL sequence.

In a fifth aspect, alone or in combination with one or more of the first through fourth aspects, the configuration supports cell center communications with transmission switching, and the UL CA provides eleven slots that support DL transmissions and seven slots that support UL transmissions.

In a sixth aspect, alone or in combination with one or more of the first through fifth aspects, the configuration supports cell edge communications without transmission switching, and the UL CA provides eleven slots that support DL transmissions and six slots that support UL transmissions.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
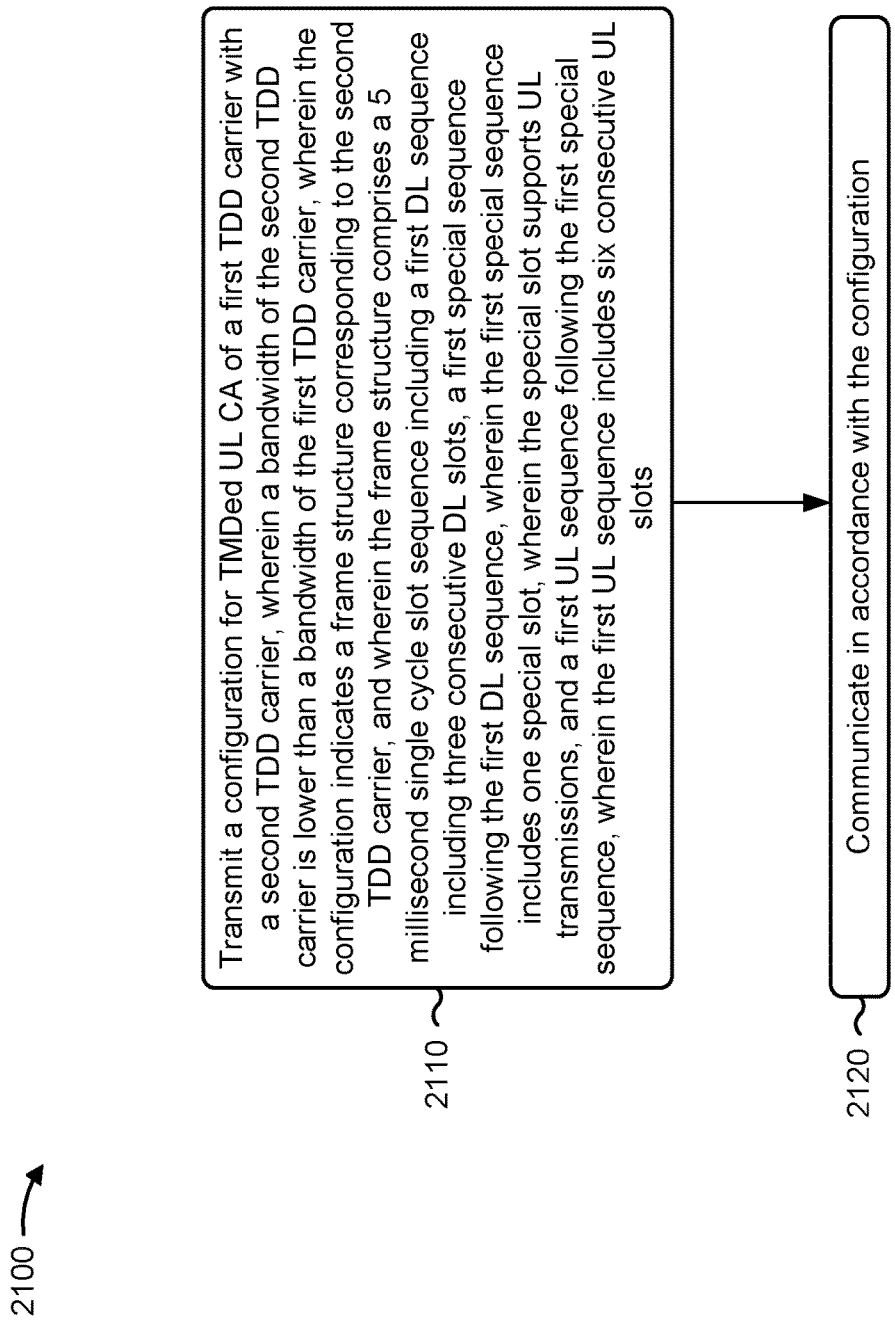

FIG. 21 is a diagram illustrating an example process 2100 performed, for example, by a base station, in accordance with various aspects of the present disclosure. Example process 2100 is an example where the base station (e.g., base station 110 and/or the like) performs operations associated with frame structures for UL CA of two TDD carriers.

As shown in FIG. 21, in some aspects, process 2100 may include transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots (block 2110). For example, the base station (e.g., using transmit processor 220, controller/processor 240, memory 242, and/or the like) may transmit a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including three consecutive DL slots, a first special sequence following the first DL sequence, wherein the first special sequence includes one special slot, wherein the special slot supports UL transmissions, and a first UL sequence following the first special sequence, wherein the first UL sequence includes six consecutive UL slots.

As further shown in FIG. 21, in some aspects, process 2100 may include communicating in accordance with the configuration (block 2120). For example, the base station (e.g., using transmit processor 220, receive processor 238, controller/processor 240, memory 242, and/or the like) may communicate in accordance with the configuration, as described above.

Process 2100 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure further includes a 0.5 millisecond offset preceding the first DL sequence.

In a fifth aspect, alone or in combination with one or more of the first through fourth aspects, the configuration supports cell center communications with transmission switching, and the UL CA provides eleven slots that support DL transmissions and seven slots that support UL transmissions.

In a sixth aspect, alone or in combination with one or more of the first through fifth aspects, the configuration supports cell edge communications without transmission switching, and the UL CA provides eleven slots that support DL transmissions and six slots that support UL transmissions.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
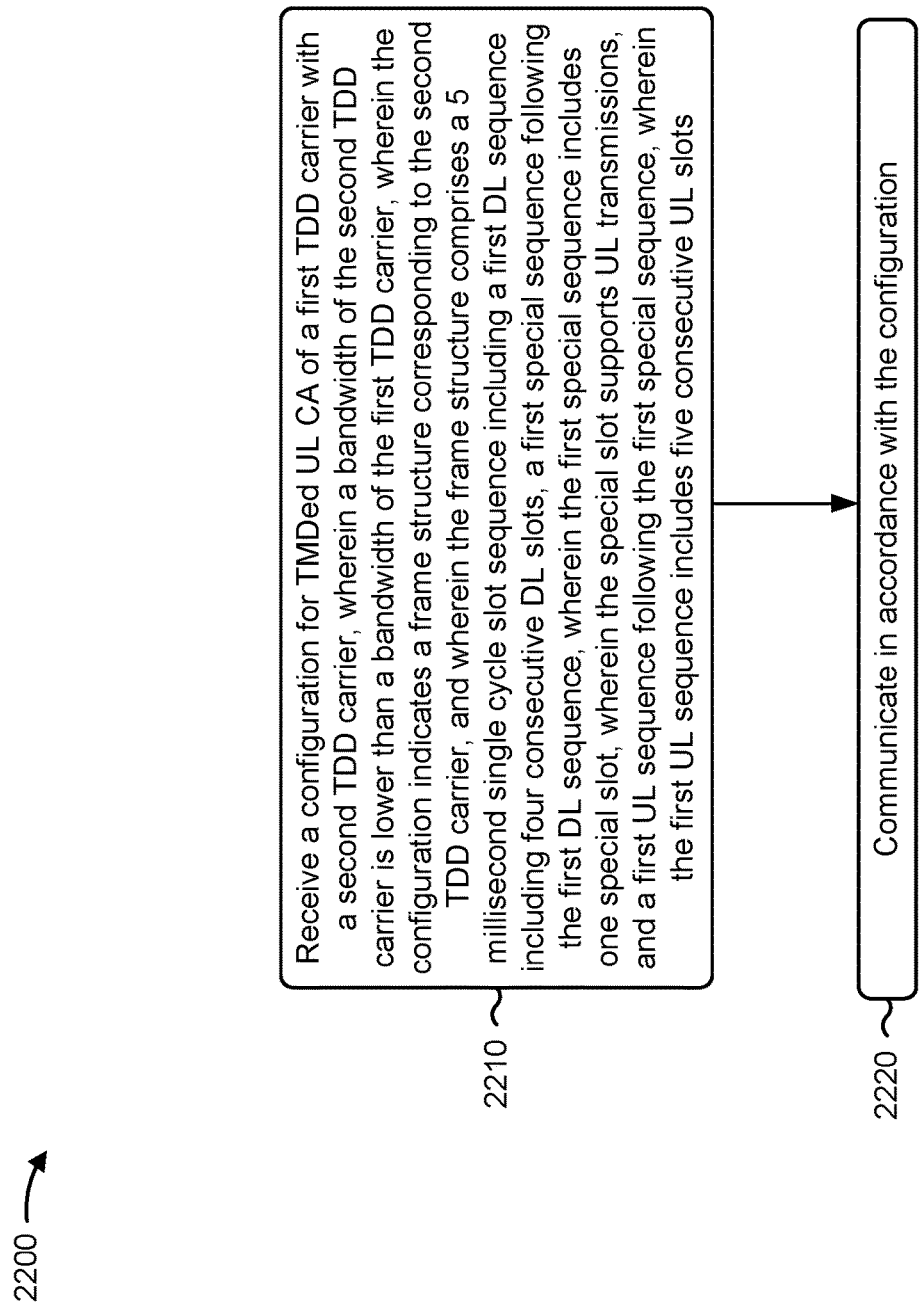

FIG. 22 is a diagram illustrating an example process 2200 performed, for example, by a UE, in accordance with various aspects of the present disclosure. Example process 2200 is an example where the UE (e.g., UE 120 and/or the like) performs operations associated with frame structures for UL CA of two TDD carriers.

As shown in FIG. 22, in some aspects, process 2200 may include receiving a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots (block 2210). For example, the UE (e.g., using receive processor 258, controller/processor 280, memory 282, and/or the like) may receive a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots.

As further shown in FIG. 22, in some aspects, process 2200 may include communicating in accordance with the configuration (block 2220). For example, the UE (e.g., using receive processor 258, transmit processor 264, controller/processor 280, memory 282, and/or the like) may communicate in accordance with the configuration, as described above.

Process 2200 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure does not include an offset preceding the first DL sequence.

In a fifth aspect, alone or in combination with one or more of the first through fourth aspects, the configuration supports cell center communications with transmission switching, and the UL CA provides twelve slots that support DL transmissions and six slots that support UL transmissions.

In a sixth aspect, alone or in combination with one or more of the first through fifth aspects, the configuration supports cell edge communications without transmission switching, and the UL CA provides twelve slots that support DL transmissions and five slots that support UL transmissions.

Although FIG. 22 shows example blocks of process 2200, in some aspects, process 2200 may include additional blocks, fewer blocks, different blocks, or differently arranged blocks than those depicted in FIG. 22. Additionally, or alternatively, two or more of the blocks of process 2200 may be performed in parallel.

Figure 23:
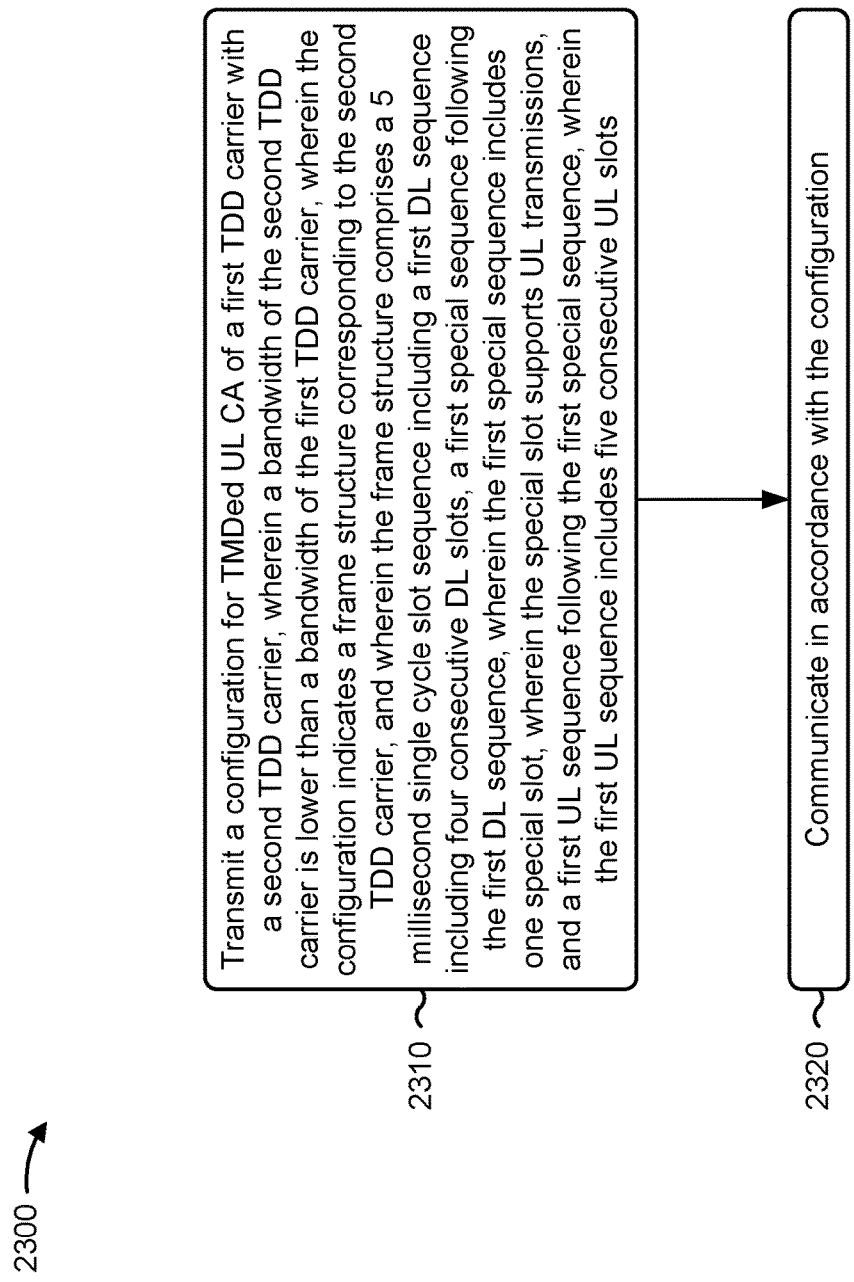

FIG. 23 is a diagram illustrating an example process 2300 performed, for example, by a base station, in accordance with various aspects of the present disclosure. Example process 2300 is an example where the base station (e.g., base station 110 and/or the like) performs operations associated with frame structures for UL CA of two TDD carriers.

As shown in FIG. 23, in some aspects, process 2300 may include transmitting a configuration for TMDed UL CA of a first TDD carrier with a second TDD carrier, wherein a bandwidth of the second TDD carrier is lower than a bandwidth of the first TDD carrier, wherein the configuration indicates a frame structure corresponding to the second TDD carrier, and wherein the frame structure comprises a 5 millisecond single cycle slot sequence including a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots (block 2310). For example, the base station (e.g., using transmit processor 220, controller/processor 240, memory 242, and/or the like) may transmit a configuration for TMDed UL CA of a first TDD carrier with a second TDD carrier, as described above. In some aspects, a bandwidth of the second TDD carrier is lower than a bandwidth of the first TDD carrier. In some aspects, the configuration indicates a frame structure corresponding to the second TDD carrier. In some aspects, the frame structure comprises a 5 millisecond single cycle slot sequence including a first DL sequence including four consecutive DL slots, a first special sequence following the first DL sequence, wherein the first special sequence includes one special slot, wherein the special slot supports UL transmissions, and a first UL sequence following the first special sequence, wherein the first UL sequence includes five consecutive UL slots.

As further shown in FIG. 23, in some aspects, process 2300 may include communicating in accordance with the configuration (block 2320). For example, the base station (e.g., using transmit processor 220, receive processor 238, controller/processor 240, memory 242, and/or the like) may communicate in accordance with the configuration, as described above.

Process 2300 may include additional aspects, such as any single aspect or any combination of aspects described below and/or in connection with one or more other processes described elsewhere herein.

In a first aspect, the second TDD carrier supports a maximum rank of two.

In a second aspect, alone or in combination with the first aspect, the first TDD carrier supports a maximum rank of two.

In a third aspect, alone or in combination with one or more of the first and second aspects, the configuration indicates an additional frame structure corresponding to the first TDD carrier, and the additional frame structure comprises a 2.5 millisecond dual cycle slot sequence including a second DL sequence including three consecutive DL slots, a second special sequence following the second DL sequence, wherein the second special sequence includes one special slot, a second UL sequence following the second special sequence, wherein the second UL sequence includes one UL slot, a third DL sequence following the second UL sequence, wherein the third DL sequence includes two consecutive DL slots, a third special sequence following the third DL sequence, wherein the third special sequence includes one special slot, and a third UL sequence following the third special sequence, wherein the third UL sequence includes two consecutive UL slots.

In a fourth aspect, alone or in combination with one or more of the first through third aspects, the frame structure does not include an offset preceding the first DL sequence.

In a fifth aspect, alone or in combination with one or more of the first through fourth aspects, the configuration supports cell center communications with transmission switching, and the UL CA provides twelve slots that support DL transmissions and six slots that support UL transmissions.

In a sixth aspect, alone or in combination with one or more of the first through fifth aspects, the configuration supports cell edge communications without transmission switching, and the UL CA provides twelve slots that support DL transmissions and five slots that support UL transmissions.

Although FIG. 23 shows example blocks of process 2300, in some aspects, process 2300 may include additional blocks, fewer blocks, different blocks, or differently arranged blocks than those depicted in FIG. 23. Additionally, or alternatively, two or more of the blocks of process 2300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment, comprising:
receiving a configuration for time division multiplexed uplink carrier aggregation of a first time division duplex carrier with a second time division duplex carrier, wherein a bandwidth of the second time division duplex carrier is lower than a bandwidth of the first time division duplex carrier, wherein the configuration indicates a frame structure corresponding to the second time division duplex carrier, and wherein the frame structure comprises a 2.5 millisecond single cycle slot sequence including:
a first downlink sequence including two consecutive downlink slots,
a first special sequence following the first downlink sequence, wherein the first special sequence includes one special slot, wherein the special slot supports uplink transmissions, and
a first uplink sequence following the first special sequence, wherein the first uplink sequence includes two consecutive uplink slots; and
communicating in accordance with the configuration.

2. The method of claim 1, wherein at least one of the first time division duplex carrier or the second time division duplex carrier supports a maximum rank of two.

3. The method of claim 1, wherein the configuration indicates an additional frame structure corresponding to the first time division duplex carrier, and wherein the additional frame structure comprises a 2.5 millisecond dual cycle slot sequence including:
a second downlink sequence including three consecutive downlink slots,
a second special sequence following the second downlink sequence, wherein the second special sequence includes one special slot,
a second uplink sequence following the second special sequence, wherein the second uplink sequence includes one uplink slot,
a third downlink sequence following the second uplink sequence, wherein the third downlink sequence includes two consecutive downlink slots,
a third special sequence following the third downlink sequence, wherein the third special sequence includes one special slot, and
a third uplink sequence following the third special sequence, wherein the third uplink sequence includes two consecutive uplink slots.

4. The method of claim 1, wherein the frame structure further includes a 1.5 millisecond offset preceding the first downlink sequence.

5. The method of claim 1, wherein the configuration supports cell center communications with transmission switching, and wherein the uplink carrier aggregation provides:
twelve slots that support downlink transmissions, and
seven slots that support uplink transmissions.

6. The method of claim 1, wherein the configuration supports cell edge communications without transmission switching, and wherein the uplink carrier aggregation provides:
twelve slots that support downlink transmissions, and
four slots that support uplink transmissions.

7. A method of wireless communication performed by a user equipment, comprising:
receiving a configuration for time division multiplexed uplink carrier aggregation of a first time division duplex carrier with a second time division duplex carrier, wherein a bandwidth of the second time division duplex carrier is lower than a bandwidth of the first time division duplex carrier, wherein the configuration indicates a frame structure corresponding to the second time division duplex carrier, and wherein the frame structure comprises a 2.5 millisecond single cycle slot sequence including:
a first downlink sequence including one downlink slot,
a first special sequence following the first downlink sequence, wherein the first special sequence includes one special slot, wherein the special slot supports uplink transmissions, and
a first uplink sequence following the first special sequence, wherein the first uplink sequence includes three consecutive uplink slots; and
communicating in accordance with the configuration.

8. The method of claim 7, wherein at least one of the first time division duplex carrier or the second time division duplex carrier supports a maximum rank of two.

9. The method of claim 7, wherein the configuration indicates an additional frame structure corresponding to the first time division duplex carrier, and wherein the additional frame structure comprises a 2.5 millisecond dual cycle slot sequence including:
a second downlink sequence including three consecutive downlink slots,
a second special sequence following the second downlink sequence, wherein the second special sequence includes one special slot,
a second uplink sequence following the second special sequence, wherein the second uplink sequence includes one uplink slot,
a third downlink sequence following the second uplink sequence, wherein the third downlink sequence includes two consecutive downlink slots,
a third special sequence following the third downlink sequence, wherein the third special sequence includes one special slot, and
a third uplink sequence following the third special sequence, wherein the third uplink sequence includes two consecutive uplink slots.

10. The method of claim 7, wherein the frame structure further includes a 1.5 millisecond offset preceding the first downlink sequence.

11. The method of claim 7, wherein the configuration supports cell center communications with transmission switching, and wherein the uplink carrier aggregation provides:
  eleven slots that support downlink transmissions, and
  nine slots that support uplink transmissions.

12. The method of claim 7, wherein the configuration supports cell edge communications without transmission switching, and wherein the uplink carrier aggregation provides:
  eleven slots that support downlink transmissions, and
  six slots that support uplink transmissions.

13. A method of wireless communication performed by a user equipment, comprising:
  receiving a configuration for time division multiplexed uplink carrier aggregation of a first time division duplex carrier with a second time division duplex carrier, wherein a bandwidth of the second time division duplex carrier is lower than a bandwidth of the first time division duplex carrier, wherein the configuration indicates a frame structure corresponding to the second time division duplex carrier, and wherein the frame structure comprises a 5 millisecond single cycle slot sequence including:
  a first downlink sequence including one downlink slot,
    a first special sequence following the first downlink sequence, wherein the first special sequence includes one special slot, wherein the special slot supports uplink transmissions, and
    a first uplink sequence following the first special sequence, wherein the first uplink sequence includes eight consecutive uplink slots; and
  communicating in accordance with the configuration.

14. The method of claim 13, wherein the second time division duplex carrier supports a maximum rank of two.

15. The method of claim 13, wherein the first time division duplex carrier supports a maximum rank of two.

16. The method of claim 13, wherein the configuration indicates an additional frame structure corresponding to the first time division duplex carrier, and wherein the additional frame structure comprises a 2.5 millisecond dual cycle slot sequence including:
  a second downlink sequence including three consecutive downlink slots,
  a second special sequence following the second downlink sequence, wherein the second special sequence includes one special slot,
  a second uplink sequence following the second special sequence, wherein the second uplink sequence includes one uplink slot,
  a third downlink sequence following the second uplink sequence, wherein the third downlink sequence includes two consecutive downlink slots,
  a third special sequence following the third downlink sequence, wherein the third special sequence includes one special slot, and
  a third uplink sequence following the third special sequence, wherein the third uplink sequence includes two consecutive uplink slots.

17. The method of claim 13, wherein the frame structure further includes a 1.5 millisecond offset preceding the first downlink sequence.

18. The method of claim 13, wherein the frame structure further includes a 2 millisecond offset preceding the first downlink sequence.

19. The method of claim 13, wherein the configuration supports cell center communications with transmission switching, and wherein the uplink carrier aggregation provides:
  nine slots that support downlink transmissions, and
  nine slots that support uplink transmissions.

20. The method of claim 13, wherein the configuration supports cell edge communications without transmission switching, and wherein the uplink carrier aggregation provides:
  eight slots that support downlink transmissions, and
  eight slots that support uplink transmissions.

21. The method of claim 13, wherein the frame structure does not include an offset.

22. The method of claim 13, wherein the configuration supports cell center communications with transmission switching, and wherein the uplink carrier aggregation provides:
  nine slots that support downlink transmissions, and
  eight slots that support uplink transmissions.

23. The method of claim 13, wherein the configuration supports cell edge communications without transmission switching, and wherein the uplink carrier aggregation provides:
  nine slots that support downlink transmissions, and
  eight slots that support uplink transmissions.

24. A method of wireless communication performed by a user equipment, comprising:
  receiving a configuration for time division multiplexed uplink carrier aggregation of a first time division duplex carrier with a second time division duplex carrier, wherein a bandwidth of the second time division duplex carrier is lower than a bandwidth of the first time division duplex carrier, wherein the configuration indicates a frame structure corresponding to the second time division duplex carrier, and wherein the frame structure comprises a 5 millisecond single cycle slot sequence including:
  a first downlink sequence including four consecutive downlink slots,
    a first special sequence following the first downlink sequence, wherein the first special sequence includes one special slot, wherein the special slot supports uplink transmissions, and
    a first uplink sequence following the first special sequence, wherein the first uplink sequence includes five consecutive uplink slots; and
  communicating in accordance with the configuration.

25. The method of claim 24, wherein the second time division duplex carrier supports a maximum rank of two.

26. The method of claim 24, wherein the first time division duplex carrier supports a maximum rank of two.

27. The method of claim 24, wherein the configuration indicates an additional frame structure corresponding to the first time division duplex carrier, and wherein the additional frame structure comprises a 2.5 millisecond dual cycle slot sequence including:
  a second downlink sequence including three consecutive downlink slots,
  a second special sequence following the second downlink sequence, wherein the second special sequence includes one special slot,
  a second uplink sequence following the second special sequence, wherein the second uplink sequence includes one uplink slot, a third downlink sequence following the second uplink sequence, wherein the third downlink sequence includes two consecutive downlink slots, a third special sequence following the third downlink sequence, wherein the third special sequence includes one special slot, and a third uplink sequence following the third special sequence, wherein the third uplink sequence includes two consecutive uplink slots.

28. The method of claim 24, wherein the frame structure does not include an offset preceding the first downlink sequence.

29. The method of claim 24, wherein the configuration supports cell center communications with transmission switching, and wherein the uplink carrier aggregation provides:

twelve slots that support downlink transmissions, and six slots that support uplink transmissions.

30. The method of claim 24, wherein the configuration supports cell edge communications without transmission switching, and wherein the uplink carrier aggregation provides:

twelve slots that support downlink transmissions, and five slots that support uplink transmissions.

* * * * *